US011103015B2

(12) United States Patent
Poupyrev et al.

(10) Patent No.: US 11,103,015 B2
(45) Date of Patent: Aug. 31, 2021

(54) INTERACTIVE FABRIC

(71) Applicant: Google LLC, Mountain View, CA (US)

(72) Inventors: Ivan Poupyrev, Sunnyvale, CA (US); Carsten C. Schwesig, San Francisco, CA (US); Mustafa Emre Karagozler, Mountain View, CA (US); Hakim K. Raja, Mountain View, CA (US); David Scott Allmon, Sunnyvale, CA (US); Gerard George Pallipuram, Cupertino, CA (US); Shiho Fukuhara, Tokyo (JP); Nan-Wei Gong, Cambridge, MA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/843,813

(22) Filed: Apr. 8, 2020

(65) Prior Publication Data
US 2020/0229515 A1 Jul. 23, 2020

Related U.S. Application Data

(63) Continuation of application No. 16/356,748, filed on Mar. 18, 2019, now Pat. No. 10,660,379, which is a
(Continued)

(51) Int. Cl.
*A41D 1/00* (2018.01)
*G06F 1/16* (2006.01)
(Continued)

(52) U.S. Cl.
CPC .............. *A41D 1/005* (2013.01); *D02G 3/12* (2013.01); *D02G 3/441* (2013.01); *D03D 1/0088* (2013.01);
(Continued)

(58) Field of Classification Search
CPC .......... A41D 1/005; D02G 3/441; D02G 3/12; D02G 3/36; G06F 1/163; G06F 3/044;
(Continued)

(56) References Cited

U.S. PATENT DOCUMENTS 6,380,882 B1  4/2002  Hegnauer
7,158,076 B2  1/2007  Fiore et al.
(Continued)

FOREIGN PATENT DOCUMENTS

CN    101636711    1/2010
CN    103091667    5/2013
(Continued)

OTHER PUBLICATIONS

"Foreign Office Action", CN Application No. 201680038897.4, dated Jun. 29, 2020, 28 pages.
(Continued)

*Primary Examiner* — Hirdepal Singh
(74) *Attorney, Agent, or Firm* — Colby Nipper PLLC

(57) ABSTRACT

This document describes techniques using, and objects embodying, an interactive fabric which is configured to sense user interactions in the form of single or multi-touch-input (e.g., gestures). The interactive fabric may be integrated into a wearable interactive garment (e.g., a jacket, shirt, or pants) that is coupled (e.g., via a wired or wireless connection) to a gesture manager. The gesture manager may be implemented at the interactive garment, or remote from the interactive garment, such as at a computing device that is wirelessly paired with the interactive garment and/or at a remote cloud based service. Generally, the gesture manager recognizes user interactions to the interactive fabric, and in response, triggers various different types of functionality, such as answering a phone call, sending a text message, creating a journal entry, and so forth.

23 Claims, 11 Drawing Sheets

Related U.S. Application Data continuation of application No. 15/595,649, filed on May 15, 2017, now Pat. No. 10,285,456.

(60) Provisional application No. 62/337,281, filed on May 16, 2016.

(51) Int. Cl.

| | | |
|---|---|---|
| *D02G 3/44* | (2006.01) | |
| *D02G 3/12* | (2006.01) | |
| *D03D 1/00* | (2006.01) | |
| *G06F 3/044* | (2006.01) | |
| *G06F 3/0488* | (2013.01) | |
| *D02G 3/36* | (2006.01) | |

(52) U.S. Cl.
CPC .............. *G06F 1/163* (2013.01); *G06F 3/044* (2013.01); *G06F 3/04883* (2013.01); *D02G 3/36* (2013.01); *D10B 2101/20* (2013.01); *G06F 2203/04102* (2013.01)

(58) Field of Classification Search
CPC ....... G06F 3/04883; G06F 2203/04102; G06F 3/0446; D03D 1/0088; D10B 2101/20
USPC ...................................................... 340/573.1
See application file for complete search history.

(56) References Cited

U.S. PATENT DOCUMENTS

| | | | |
|---|---|---|---|
| 7,205,932 | B2 | 4/2007 | Fiore |
| 7,266,532 | B2 | 9/2007 | Sutton et al. |
| 7,845,023 | B2 | 12/2010 | Swatee |
| 8,860,602 | B2 | 10/2014 | Nohara et al. |
| 9,075,429 | B1 | 7/2015 | Karakotsios et al. |
| 9,223,494 | B1 | 12/2015 | Desalvo et al. |
| 9,229,102 | B1 | 1/2016 | Wright et al. |
| 9,316,727 | B2 | 4/2016 | Sentelle et al. |
| 9,346,167 | B2 | 5/2016 | O'Connor et al. |
| 9,746,551 | B2 | 8/2017 | Scholten et al. |
| 9,947,080 | B2 | 4/2018 | Nguyen et al. |
| 10,063,427 | B1 | 8/2018 | Brown |
| 10,073,590 | B2 | 9/2018 | Dascola et al. |
| 10,241,581 | B2 | 3/2019 | Lien et al. |
| 10,268,321 | B2 | 4/2019 | Poupyrev |
| 10,285,456 | B2 | 5/2019 | Poupyrev et al. |
| 10,300,370 | B1 | 5/2019 | Amihood et al. |
| 10,310,620 | B2 | 6/2019 | Lien et al. |
| 10,310,621 | B1 | 6/2019 | Lien et al. |
| 10,379,621 | B2 | 8/2019 | Schwesig et al. |
| 10,401,490 | B2 | 9/2019 | Gillian et al. |
| 10,409,385 | B2 | 9/2019 | Poupyrev |
| 10,459,080 | B1 | 10/2019 | Schwesig et al. |
| 10,492,302 | B2 | 11/2019 | Karagozler et al. |
| 10,496,182 | B2 | 12/2019 | Lien et al. |
| 10,503,883 | B1 | 12/2019 | Gillian et al. |
| 10,509,478 | B2 | 12/2019 | Poupyrev et al. |
| 10,540,001 | B1 | 1/2020 | Poupyrev et al. |
| 10,572,027 | B2 | 2/2020 | Poupyrev et al. |
| 10,579,150 | B2 | 3/2020 | Gu et al. |
| 10,642,367 | B2 | 5/2020 | Poupyrev |
| 10,660,379 | B2 | 5/2020 | Poupyrev et al. |
| 10,664,059 | B2 | 5/2020 | Poupyrev |
| 10,664,061 | B2 | 5/2020 | Poupyrev |
| 10,705,185 | B1 | 7/2020 | Lien et al. |
| 10,768,712 | B2 | 9/2020 | Schwesig et al. |
| 10,817,065 | B1 | 10/2020 | Lien et al. |
| 10,817,070 | B2 | 10/2020 | Lien et al. |
| 10,908,696 | B2 | 2/2021 | Amihood et al. |
| 10,936,081 | B2 | 3/2021 | Poupyrev |
| 10,936,085 | B2 | 3/2021 | Poupyrev et al. |
| 10,948,996 | B2 | 3/2021 | Poupyrev et al. |
| 2003/0005030 | A1 | 1/2003 | Sutton et al. |
| 2004/0046736 | A1 | 3/2004 | Pryor et al. |
| 2004/0157662 | A1 | 8/2004 | Tsuchiya |
| 2005/0231419 | A1 | 10/2005 | Mitchell |
| 2005/0267366 | A1 | 12/2005 | Murashita et al. |
| 2006/0284757 | A1 | 12/2006 | Zemany |
| 2008/0074307 | A1 | 3/2008 | Boric-Lubecke et al. |
| 2009/0226043 | A1 | 9/2009 | Angell et al. |
| 2009/0292468 | A1 | 11/2009 | Wu et al. |
| 2009/0303100 | A1 | 12/2009 | Zemany |
| 2010/0109938 | A1 | 5/2010 | Oswald et al. |
| 2010/0152600 | A1 | 6/2010 | Droitcour et al. |
| 2010/0198067 | A1 | 8/2010 | Mahfouz et al. |
| 2011/0083111 | A1 | 4/2011 | Forutanpour et al. |
| 2011/0316888 | A1 | 12/2011 | Sachs et al. |
| 2012/0105358 | A1 | 5/2012 | Momeyer et al. |
| 2012/0182222 | A1 | 7/2012 | Moloney |
| 2012/0200600 | A1 | 8/2012 | Demaine |
| 2012/0270564 | A1 | 10/2012 | Gum et al. |
| 2013/0076788 | A1 | 3/2013 | Ben Zvi |
| 2013/0106710 | A1 | 5/2013 | Ashbrook |
| 2013/0113647 | A1 | 5/2013 | Sentelle et al. |
| 2013/0222232 | A1 | 8/2013 | Kong et al. |
| 2013/0241765 | A1 | 9/2013 | Kozma et al. |
| 2013/0245986 | A1 | 9/2013 | Grokop et al. |
| 2013/0249793 | A1 | 9/2013 | Zhu et al. |
| 2014/0022108 | A1 | 1/2014 | Alberth et al. |
| 2014/0035737 | A1 | 2/2014 | Rashid et al. |
| 2014/0097979 | A1 | 4/2014 | Nohara et al. |
| 2015/0084855 | A1 | 3/2015 | Song et al. |
| 2015/0106770 | A1 | 4/2015 | Shah et al. |
| 2015/0314780 | A1 | 11/2015 | Stenneth et al. |
| 2015/0346701 | A1 | 12/2015 | Gordon et al. |
| 2016/0011668 | A1 | 1/2016 | Gilad-Bachrach et al. |
| 2016/0085296 | A1* | 3/2016 | Mo ................ D03D 1/0088 345/156 |
| 2016/0124579 | A1 | 5/2016 | Tokutake |
| 2016/0146931 | A1 | 5/2016 | Rao et al. |
| 2016/0291143 | A1 | 10/2016 | Cao et al. |
| 2017/0060298 | A1* | 3/2017 | Hwang ............... A61B 5/6804 |
| 2017/0196513 | A1* | 7/2017 | Longinotti-Buitoni ..................... H05K 1/0283 |
| 2017/0224280 | A1* | 8/2017 | Bozkurt ................. A61B 5/282 |
| 2017/0249033 | A1* | 8/2017 | Podhajny ............... G06F 3/044 |
| 2019/0138109 | A1 | 5/2019 | Poupyrev et al. |
| 2019/0155396 | A1 | 5/2019 | Lien et al. |
| 2019/0232156 | A1 | 8/2019 | Amihood et al. |
| 2019/0243464 | A1 | 8/2019 | Lien et al. |
| 2019/0257939 | A1 | 8/2019 | Schwesig et al. |
| 2019/0278379 | A1 | 9/2019 | Gribetz et al. |
| 2019/0321719 | A1 | 10/2019 | Gillian et al. |
| 2019/0391667 | A1 | 12/2019 | Poupyrev |
| 2019/0394884 | A1 | 12/2019 | Karagozler et al. |
| 2020/0064924 | A1 | 2/2020 | Poupyrev et al. |
| 2020/0089314 | A1 | 3/2020 | Poupyrev et al. |
| 2020/0150776 | A1 | 5/2020 | Poupyrev et al. |
| 2020/0218361 | A1 | 7/2020 | Poupyrev |
| 2020/0278422 | A1 | 9/2020 | Lien et al. |
| 2020/0326708 | A1 | 10/2020 | Wang et al. |
| 2020/0393912 | A1 | 12/2020 | Lien et al. |
| 2020/0409472 | A1 | 12/2020 | Lien et al. |
| 2021/0096653 | A1 | 4/2021 | Amihood et al. |
| 2021/0132702 | A1 | 5/2021 | Poupyrev |

FOREIGN PATENT DOCUMENTS

| | | |
|---|---|---|
| CN | 103534664 | 1/2014 |
| CN | 103675868 | 3/2014 |
| CN | 104115118 | 10/2014 |
| CN | 106154270 | 11/2016 |
| WO | 2004053601 | 6/2004 |
| WO | 2015149049 | 10/2015 |

OTHER PUBLICATIONS

"Foreign Office Action", CN Application No. 201710922856.8, dated Jun. 19, 2020, 11 pages.
"Non-Final Office Action", U.S. Appl. No. 16/503,234, dated Aug. 5, 2020, 18 Pages.
"Non-Final Office Action", U.S. Appl. No. 16/669,842, dated Sep. 3, 2020, 12 pages.

(56) References Cited

OTHER PUBLICATIONS

"Notice of Allowance", U.S. Appl. No. 15/093,533, dated Jul. 16, 2020, 5 Pages.
"Notice of Allowance", U.S. Appl. No. 16/380,245, dated Sep. 15, 2020, 7 Pages.
"Corrected Notice of Allowance", U.S. Appl. No. 16/380,245, dated Jan. 6, 2021, 2 pages.
"Corrected Notice of Allowance", U.S. Appl. No. 16/560,085, dated Jan. 28, 2021, 2 pages.
"Corrected Notice of Allowance", U.S. Appl. No. 16/744,626, dated Feb. 3, 2021, 2 pages.
"Corrected Notice of Allowance", U.S. Appl. No. 16/669,842, dated Feb. 18, 2021, 2 pages.
"Corrected Notice of Allowance", U.S. Appl. No. 16/560,085, dated Dec. 14, 2020, 2 pages.
"Corrected Notice of Allowance", U.S. Appl. No. 16/380,245, dated Dec. 18, 2020, 2 pages.
"Final Office Action", U.S. Appl. No. 16/503,234, dated Dec. 30, 2020, 14 pages.
"Notice of Allowance", U.S. Appl. No. 16/744,626, dated Jan. 1, 2021, 10 pages.
"Notice of Allowance", U.S. Appl. No. 16/669,842, dated Dec. 18, 2020, 8 pages.
"Notice of Allowance", U.S. Appl. No. 16/401,611, dated Jun. 10, 2020, 17 Pages.
"Notice of Allowance", U.S. Appl. No. 16/252,477, dated Jun. 24, 2020, 8 Pages.
"Pre-Interview Communication", U.S. Appl. No. 16/401,611, dated Apr. 13, 2020, 4 Pages.
"Pre-Interview Communication", U.S. Appl. No. 16/380,245, dated Jun. 15, 2020, 3 Pages.
"Corrected Notice of Allowance", U.S. Appl. No. 16/252,477, dated Sep. 30, 2020, 2 pages.
"Corrected Notice of Allowance", U.S. Appl. No. 16/380,245, dated Jan. 15, 2020, 2 pages.
"Foreign Office Action", JP Application No. 2019-078554, dated Jul. 21, 2020, 12 pages.
"Non-Final Office Action", U.S. Appl. No. 16/744,626, dated Sep. 23, 2020, 9 Pages.
"Non-Final Office Action", U.S. Appl. No. 16/689,519, dated Oct. 20, 2020, 22 pages.
"Notice of Allowability", U.S. Appl. No. 16/560,085, dated Nov. 12, 2020, 2 pages.
"Notice of Allowance", U.S. Appl. No. 16/560,085, dated Oct. 19, 2020, 8 pages.
"Final Office Action", U.S. Appl. No. 15/287,359, dated Feb. 19, 2020, 16 pages.
"Final Office Action", U.S. Appl. No. 16/689,519, dated Apr. 29, 2021, 13 pages.
"Final Office Action", U.S. Appl. No. 15/287,394, dated Sep. 30, 2019, 38 pages.
"Final Office Action", U.S. Appl. No. 15/462,957, dated Nov. 8, 2019, 10 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 15/287,253, dated Apr. 4, 2019, 10 pages.
"Final Office Action", U.S. Appl. No. 14/959,901, dated May 30, 2019, 18 pages.
"Final Office Action", U.S. Appl. No. 16/238,464, dated Jul. 25, 2019, 15 pages.
"First Action Interview Office Action", U.S. Appl. No. 15/917,238, dated Jun. 6, 2019, 6 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", PCT Application No. PCT/US2017/051663, dated Jun. 20, 2019, 10 pages.

"Non-Final Office Action", U.S. Appl. No. 16/252,477, dated Jan. 10, 2020, 13 pages.
"Non-Final Office Action", U.S. Appl. No. 16/822,601, dated Mar. 15, 2021, 17 pages.
"Non-Final Office Action", U.S. Appl. No. 16/503,234, dated Mar. 18, 2021, 17 pages.
"Non-Final Office Action", U.S. Appl. No. 17/005,207, dated Apr. 1, 2021, 23 pages.
"Non-Final Office Action", U.S. Appl. No. 15/286,537, dated Sep. 3, 2019, 28 pages.
"Non-Final Office Action", U.S. Appl. No. 15/791,044, dated Sep. 30, 2019, 22 pages.
"Non-Final Office Action", U.S. Appl. No. 16/153,395, dated Oct. 22, 2019, 10 pages.
"Non-Final Office Action", U.S. Appl. No. 15/287,394, dated Mar. 22, 2019, 39 pages.
"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/462,957, dated Jan. 23, 2020, 8 pages.
"Notice of Allowance", U.S. Appl. No. 15/791,044, dated Feb. 12, 2020, 8 pages.
"Notice of Allowance", U.S. Appl. No. 16/153,395, dated Feb. 20, 2020, 13 pages.
"Notice of Allowance", U.S. Appl. No. 15/287,394, dated Mar. 4, 2020, 11 pages.
"Notice of Allowance", U.S. Appl. No. 15/287,308, dated Jul. 17, 2019, 17 pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 pages.
"Notice of Allowance", U.S. Appl. No. 15/287,253, dated Aug. 26, 2019, 13 pages.
"Notice of Allowance", U.S. Appl. No. 16/238,464, dated Nov. 4, 2019, 10 pages.
"Notice of Allowance", U.S. Appl. No. 15/424,263, dated Nov. 14, 2019, 10 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Notice of Allowance", U.S. Appl. No. 15/352,194, dated Jun. 26, 2019, 8 pages.
"Notice of Allowance", U.S. Appl. No. 15/287,155, dated Jul. 25, 2019, 7 pages.
"Pre-Interview Communication", U.S. Appl. No. 15/917,238, dated May 1, 2019, 6 pages.
"Restriction Requirement", U.S. Appl. No. 16/563,124, dated Apr. 5, 2021, 7 pages.
"Samsung Galaxy S4 Air Gestures", Video retrieved from https://www.youtube.com/watch?v=375Hb87yGcg, May 7, 2013, 4 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
"Advisory Action", U.S. Appl. No. 16/689,519, filed Jun. 30, 2021, 2 pages.
"Corrected Notice of Allowance", U.S. Appl. No. 16/563,124, filed Jul. 23, 2021, 2 pages.
"Notice of Allowance", U.S. Appl. No. 14/504,121, filed Jun. 1, 2021, 8 pages.
"Notice of Allowance", U.S. Appl. No. 16/503,234, filed Jun. 11, 2021, 8 pages.
"Notice of Allowance", U.S. Appl. No. 16/563,124, filed Jul. 8, 2021, 9 pages.
"Notice of Allowance", U.S. Appl. No. 17/005,207, filed Jul. 14, 2021, 5 pages.
"Patent Board Decision", U.S. Appl. No. 14/504,121, filed May 20, 2021, 9 pages.

* cited by examiner

INTERACTIVE FABRIC

RELATED APPLICATIONS

This application is a continuation application of U.S. patent application Ser. No. 16/356,748, filed Mar. 18, 2019 and titled "Interactive Fabric," which is a continuation application of U.S. patent application Ser. No. 15/595,649, filed May 15, 2017, now U.S. Pat. No. 10,285,456 and titled "Interactive Fabric," which claims priority under 35 U.S.C. Section 119(e) to U.S. Provisional Patent Application No. 62/337,281, filed May 16, 2016 and titled "Interactive Fabric," the entire disclosure of which is hereby incorporated by reference.

BACKGROUND

Mobile devices, while useful, are not always easy to integrate into real life. Wearable computing, including smart clothing, may be easier to integrate into real life uses, but conventional solutions often lack good functionality, are difficult to manufacture, and may lack durability.

SUMMARY

This document describes techniques using, and objects embodying, an interactive fabric which is configured to sense user interactions in the form of single or multi-touch-input (e.g., gestures). The interactive fabric may be integrated into a wearable interactive garment (e.g., a jacket, shirt, or pants) that is coupled (e.g., via a wired or wireless connection) to a gesture manager. The gesture manager may be implemented at the interactive garment, or remote from the interactive garment, such as at a computing device that is wirelessly paired with the interactive garment and/or at a remote cloud based service. Generally, the gesture manager recognizes user interactions to the interactive fabric, and in response, triggers various different types of functionality, such as answering a phone call, sending a text message, creating a journal entry, and so forth.

This summary is provided to introduce simplified concepts concerning an interactive fabric, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for an interactive fabric are described with reference to the following drawings. The same numbers are used throughout the drawings to reference like features and components.

DETAILED DESCRIPTION

Overview

Figure 1:
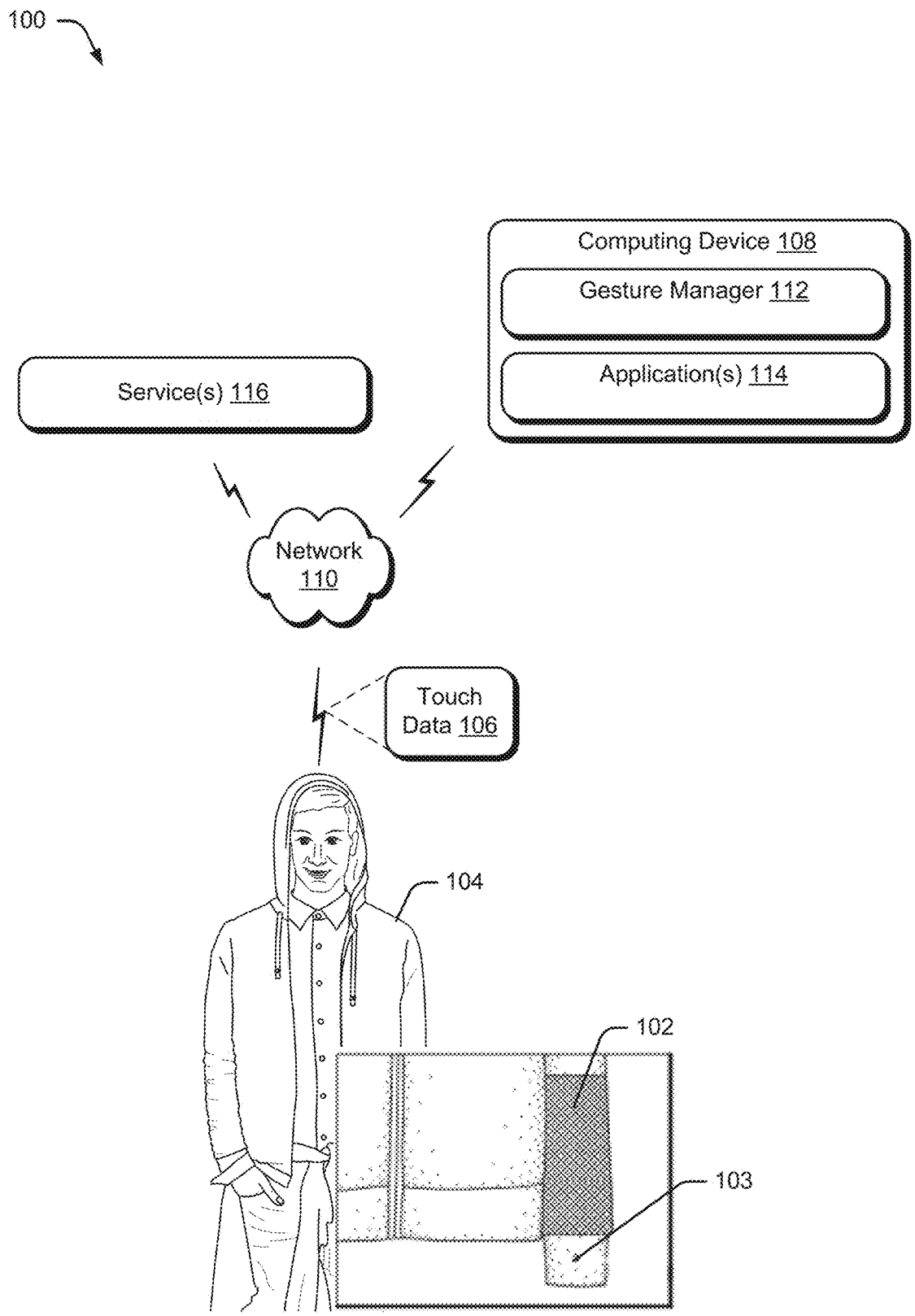
FIG. 1 is an illustration of an example environment in which an interactive fabric can be implemented.

This document describes techniques using, and objects embodying, an interactive fabric which is configured to sense user interactions in the form of single or multi-touch-input (e.g., gestures). The interactive fabric may be integrated into a wearable interactive garment (e.g., a jacket, shirt, or pants) that is coupled (e.g., via a wired or wireless connection) to a gesture manager. The gesture manager may be implemented at the interactive garment, or remote from the interactive garment, such as at a computing device that is wirelessly paired with the interactive garment and/or at a remote cloud based service. Generally, the gesture manager recognizes user interactions to the interactive fabric, and in response, triggers various different types of functionality, such as answering a phone call, sending a text message, creating a journal entry, and so forth.

Notably, therefore, the user is able to trigger various different types of functionalities through interactions with the interactive garment, such as by touching or swiping the user's shirt sleeve. In addition, by enabling the triggering of functionality through interactions with a wearable garment, instead of a device, the user does not need to fiddle around with the user interface of a smartwatch or smartphone in order trigger a functionality. In fact, the user may be able to provide the gesture to the interactive garment without even looking at the garment. In addition, a simple gesture to a garment is discreet and thus enables the user to trigger functionalities in a crowded setting without the need to take out his smartphone or other electronic device.

The interactive garment may include one or more output devices, such as light sources (e.g., LEDs), speakers, displays (e.g., flexible organic displays), shape changing materials, or vibration components. These output devices can be controlled to provide feedback to the user, such as by providing a visual, audio, and/or haptic output (e.g., flashing light, beeping, or vibrating) indicating that a particular user interaction was detected. In addition, the output devices may be controlled to provide a notification to the user (e.g., that a text message has been received at a smartphone paired with the interactive garment), such as by flashing, vibrating, or beeping.

To enable the interactive fabric to sense multi-touch-input, a conductive thread is integrated with the fabric (e.g., by weaving the conductive thread into the fabric or by embroidering the conductive thread onto the fabric) to form a capacitive touch sensor that can detect touch-input. Sensing circuitry, which is coupled to the conductive thread, is configured to process the touch-input to generate touch data that is useable to initiate functionality at the interactive garment or at various remote devices.

The conductive thread may be custom made using a modified thread or yarn spinning process in which the threads are spun using multiple conductive wires and typical yarn materials such as cotton, polyester, and silk. In this way, conventional machinery can be used to create the conductive threads, which makes the conductive thread easy to manufacture. The resulting conductive threads can have variable thicknesses, color, and feel, and can be made to look indistinguishable from ordinary yarns. The conductive threads have enough conductivity to enable single-ended capacitive sensing over a range of a few meters and enough mechanical strength to survive through fabric weaving processes as well as typical use of the interactive garment by users.

In many cases, it may be difficult to integrate bulky electronic components (e.g., batteries, microprocessors, wireless units, and sensors) into the interactive garment, such as a shirt, coat, or pair of pants. Furthermore, connecting such electronic components to a garment may cause issues with durability since garments are often washed. Thus, in one or more implementations, the interactive garment is implemented with multiple electronics modules. In some cases, the interactive garment includes at least an internal electronics module containing a first subset of electronic components for the interactive garment, and an external electronics module containing a second subset of electronic components for the interactive garment. As described herein, the internal electronics module may be physically and permanently coupled to the interactive garment, whereas the external electronics module may be removably coupled to the interactive garment. Thus, instead of integrating all of the electronics within the interactive garment, at least some of the electronics are placed in the external electronics module.

The internal electronics module may contain the sensing circuitry that is directly coupled to the conductive threads to enable the detection of touch-input to the interactive fabric, while the external electronics module contains electronic components that are needed to process and communicate the touch-input data, such as a microprocessor, a power source, a network interface, and so forth.

The interactive garment may further include a communication interface configured to enable communication between the internal electronics module and the external electronics module. In some implementations, the communication interface may be implemented as a connector that connects the electronic components in the external electronics module to the electronic components in the internal electronics module to enable the transfer of power and data between the modules. For example, the connector may be implemented utilizing pogo pins and may be modeled after a snap button. The connector may include a connector plug and a connector receptacle. For example, the connector plug may be implemented at the external electronics module and is configured to connect to the connector receptacle, which may be implemented at the interactive garment.

Thus, while the electronic components are separated into multiple different modules, the communication interface enables the system to function as a single unit. For example, the power source contained within the external electronics module may transfer power, via the communication interface, to the sensing circuitry of the internal electronics module to enable the sensing circuitry to detect touch-input to the conductive thread. When touch-input is detected by the sensing circuitry of the internal electronics module, data representative of the touch-input may be communicated, via the communication interface, to the microprocessor contained within the external electronics module. The microprocessor may then analyze the touch-input data to generate one or more control signals, which may then be communicated to a remote computing device (e.g., a smart phone) via the network interface to cause the computing device to initiate a particular functionality.

Separating the electronics of the interactive garment into multiple different modules provides a variety of different benefits. For example, the system design enables interoperability and customization because the external electronics module can be detached from the interactive garment, and then attached to a different interactive garment to carry over some of the functions and properties, such as user specific settings. Additionally, by separating the garment embedded electronics from the external electronics module, users, designers and companies are able to design the external electronics modules in the form factor, mechanical, material and surface finish qualities that are specific to the application or the user. For example, a leather jacket might have an external electronics module that is leather, and in the form of a strap that matches a certain jacket style, or allows a flexible form factor that would have been hard to achieve inside a garment.

Furthermore, separating the electronics enable broken parts to be easily replaced or serviced without the need to access the entire interactive garment. For example, the external electronics module can be shipped to a repair service, or a new external electronics module can be purchased without the need to purchase a new interactive garment. In addition, separating the electronic components into internal and external modules ensures that parts such as batteries are not exposes to washing cycles that a typical garment would go through. For example, the external electronics module, which may include the battery, can easily be removed from the interactive garment before washing the interactive garment. Furthermore, by separating parts, the manufacturing challenges are significantly simplified and certification processes (such as FCC certification for RF transmission units) can be handled over the part in question, thereby reducing the complexity.

Example Environment

FIG. 1 is an illustration of an example environment 100 in which an interactive fabric can be implemented. Environment 100 includes an interactive fabric 102, which is shown as being integrated within an interactive garment 104, which in this example is illustrated as a jacket. In environment 100, interactive fabric 102 is illustrated as being integrated into the sleeve of interactive garment 104. Notably, however, interactive fabric 102 may be integrated at any location on interactive garment 104. Interactive fabric 102 is a fabric or textile that is configured to sense multi-touch input. As described herein, interactive fabric 102 may include any type of fabric, textile, or flexible woven material consisting of a network of natural or artificial fibers, often referred to as thread or yarn.

While interactive fabric 102 is illustrated as being integrated within a jacket, it is to be appreciated that interactive fabric 102 may be integrated within any type of flexible object made from fabric or a similar flexible material, such as articles of clothing, hats, handbags, blankets, shower curtains, towels, sheets, bed spreads, or fabric casings of furniture, to name just a few. As discussed in more detail below, interactive fabric 102 may be integrated within interactive garment 104 in a variety of different ways, including weaving, sewing, gluing, and so forth.

Interactive garment 104 is configured to detect user interactions (e.g., one or more gestures) from a user, and to generate touch data 106 representative of the user interactions. Interactive garment 104 may also include one or more output devices 103, such as light sources (e.g., LEDs), speakers, displays (e.g., flexible organic displays), shape changing materials, or vibration components. The output devices 103 can be controlled to provide feedback to the user, such as by providing a visual, audio, and/or haptic output (e.g., flashing light, beeping, or vibrating) indicating that a particular user interaction was detected. In addition, the output devices 103 may be controlled to provide a notification to the user, such as by flashing, vibrating, or beeping to indicate that a text message has been received at a smartphone paired with the interactive garment 104.

In some cases, the interactive garment 104 may include processing capability to recognize the user interaction, and to initiate a particular functionality associated with the user interaction. In other cases, the touch data 106, representative of the user interactions, may be communicated to a computing device 108 via a network 110. Receipt of the touch data, causes a gesture manager 112, implemented at computing device 108, to analyze the touch data 106 to determine whether the touch data corresponds to (e.g., is mapped to) a user interaction or gesture to initiate a particular functionality or perform a particular operation. For example, a user gesture (e.g., a swipe) to interactive fabric 102 can be configured to trigger various types of functionality, such as answering a phone call, saving the user's current geographical location, playing a song, and so forth.

In various implementation, gesture manager 112 is configured to interface with one or more applications 114 and/or services 116, which may be implemented at computing device 108, or partially implemented at computing device 108 and partially implemented as a remote service (e.g., a cloud-based service) that is remote from computing device 108. Consider, for example, that a fitness-based application 114 may be implemented at device 108 which is being worn, held, or otherwise attached to the user (e.g., a smartphone or smartwatch). In this case, the application 114 at the computing device 108 may perform various functions based on the touch data 106, such as logging workout results, nutrition information, and so forth. In addition, the application 114 may present a user interface that provides the user's diet and fitness results. The application 114 may communicate with a remote service 116, which may store the fitness results, and perform other functions. By enabling an associated remote service to perform various processing tasks, the system saves processing resources at computing device 108 which conserves battery life.

Applications 114 and services 116 may include a variety of different types of applications or services, such as telephone services, messaging services (e.g., text messaging services, email services), map services, music services, and so forth. In addition, gesture manager 112 is configured to enable third-parties to develop applications 114 and services 116 that can interface with gesture manager 112. For example, gesture manager 112 may provide an infrastructure for developers by being configured to recognize various types of interactions with interactive fabric 102 and/or user contexts. Doing so enables developers to design applications 114 and services 116 to perform various functions based on the recognizable user interactions to interactive fabric 102.

Gesture manager 112, applications 114, and services 116, may be implemented by one or more computing devices, which may be configured in a variety of different ways. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in some instances, the computing device may be representative of a plurality of different devices, such as multiple servers utilized by a business to perform operations "over the cloud". In FIG. 1, application 114 is illustrated as being implemented at computing device 108 and service 116 is shown as being implemented remote from computing device 108. It is to be noted, however, that in some implementations application 114 may be implemented without service 116, or application 114 and service 116 may be implemented at a single device.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth. Further, although a single network 110 is shown, network 110 may also be configured to include multiple networks. For example, interactive garment 104 and computing device 108 may be coupled via a first type of network 110 (e.g., a Bluetooth® network connection), and computing device 108 and service 116 be coupled via a second type of network 110 (e.g., the Internet).

Figure 2:
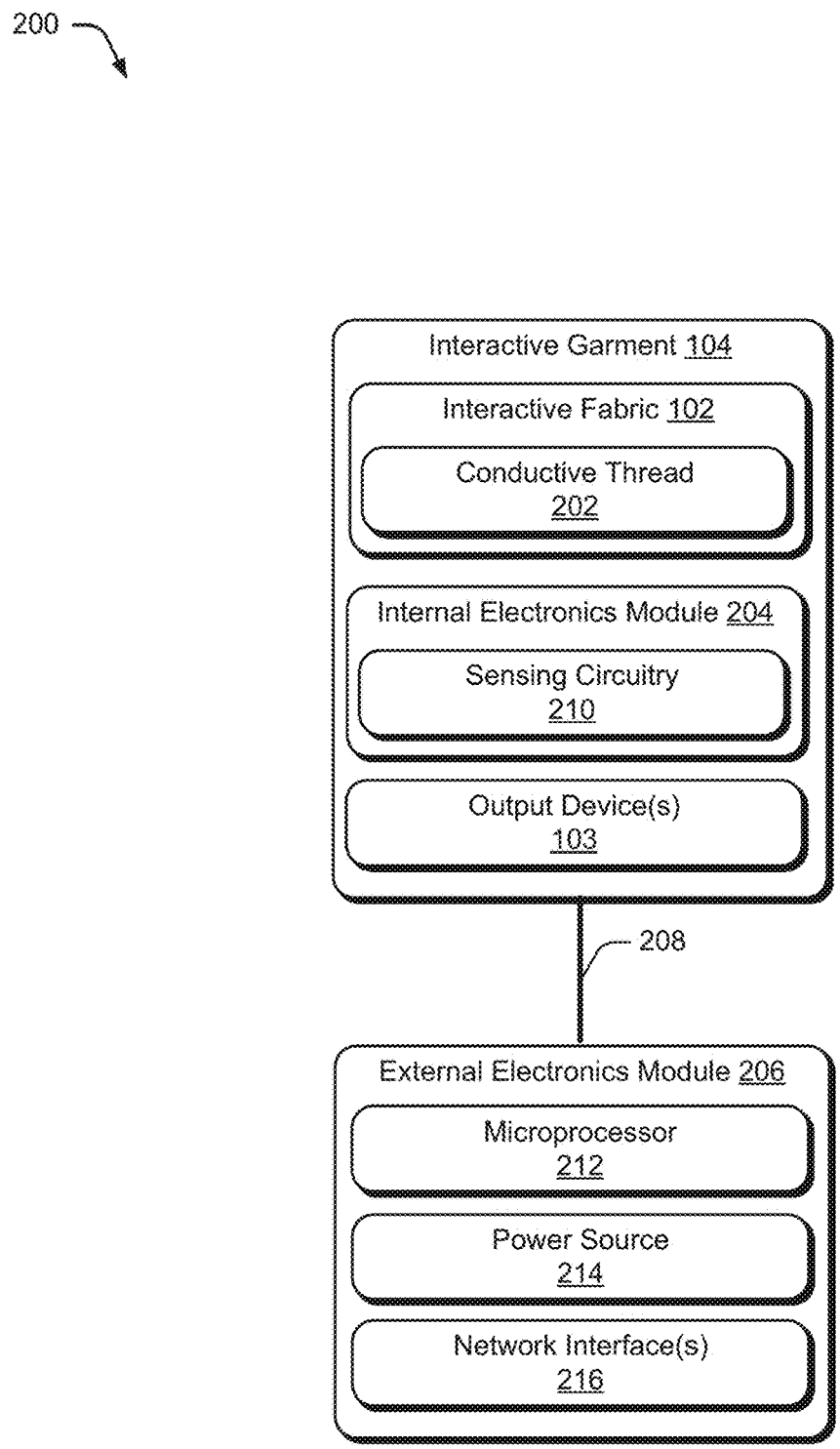
FIG. 2 illustrates an example system in which the interactive fabric may be implemented.

In more detail, consider FIG. 2 which illustrates an example system 200 in which interactive fabric 102 may be implemented. In system 200, interactive fabric 102 is integrated in interactive garment 104, which may be implemented as any type of flexible object (e.g., a jacket, shirt, hat, or handbag).

Interactive fabric 102 is configured to sense multi-touch-input from a user when one or more fingers of the user's hand touch interactive fabric 102. Interactive fabric 102 may also be configured to sense full-hand touch-input from a user, such as when an entire hand of the user touches or swipes interactive fabric 102. To enable the detection of touch-input, interactive fabric 102 includes conductive threads 202, which are integrated into interactive fabric 102 (e.g., by being woven into, or embroidered onto, interactive fabric 102) to form a touch sensor (e.g., a capacitive touch sensor). Notably, the conductive threads 202 do not alter the flexibility of interactive fabric 102, which enables interactive fabric 102 to be easily integrated within interactive garments 104.

In this example, interactive garment 104 includes an internal electronics module 204 that is embedded within interactive garment 104 and is directly coupled to conductive threads 202. Internal electronics module 204 can be communicatively coupled to an external electronics module 206 via a communication interface 208. Internal electronics module 204 contains a first subset of electronic components for the interactive garment 104, and external electronics module 206 contains a second, different, subset of electronics components for the interactive garment 104. As described herein, the internal electronics module 204 may be physically and permanently embedded within interactive garment 104, whereas the external electronics module 206 may be removably coupled to interactive garment 104.

In system 200, the electronic components contained within the internal electronics module 204 includes sensing circuitry 210 that is coupled to conductive thread 202 that is integrated with interactive fabric 102. For example, wires from the conductive threads 202 may be connected to sensing circuitry 210 using flexible PCB, creping, gluing with conductive glue, soldering, and so forth. Sensing circuitry 210 is configured to detect user interactions to interactive fabric 102, such as by detecting the location of the touch-input on conductive thread 202, as well as motion of the touch-input. For example, when an object, such as a user's finger, touches conductive thread 202, the position of the touch can be determined by sensing circuitry 210 by detecting a change in capacitance on the grid or array of conductive thread 202. The touch-input may then be used to generate touch data usable to control computing device 108. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the interactive fabric with a user's entire hand, covering the interactive fabric with the user's entire hand, pressing the interactive fabric with the user's entire hand, palm touches, and rolling, twisting, or rotating the user's hand while touching the interactive fabric).

Figure 5:
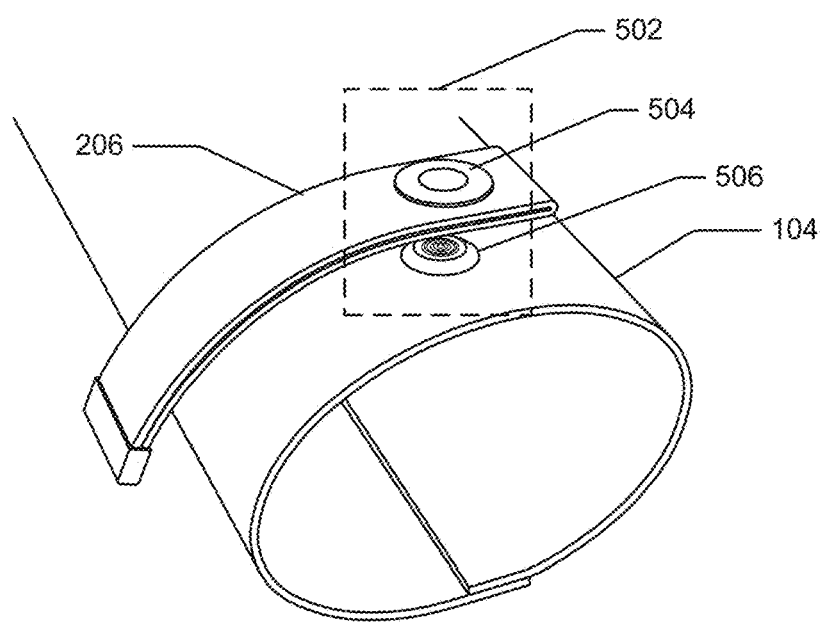
FIG. 5 illustrates an example of a connector for connecting an external electronics module to an interactive garment in accordance with one or more implementations.

Communication interface 208 enables the transfer of power and data (e.g., the touch-input detected by sensing circuitry 210) between the internal electronics module 204 and the external electronics module 206. In some implementations, communication interface 208 may be implemented as a connector that includes a connector plug and a connector receptacle. The connector plug may be implemented at the external electronics module 206 and is configured to connect to the connector receptacle, which may be implemented at the interactive garment 104. A more-detailed discussion of example connectors is discussed below with regards to FIGS. 5-7.

In system 200, the external electronics module 206 includes a microprocessor 212, power source 214, and network interface 216. Power source 214 may be coupled, via communication interface 208, to sensing circuitry 210 to provide power to sensing circuitry 210 to enable the detection of touch-input, and may be implemented as a small battery. When touch-input is detected by sensing circuitry 210 of the internal electronics module 204, data representative of the touch-input may be communicated, via communication interface 208, to microprocessor 212 of the external electronics module 206. Microprocessor 212 may then analyze the touch-input data to generate touch data 106. Touch data 106 may then be communicated to gesture manager 112, which may be implemented at computing device 108 (e.g., a smart phone), via the network interface 216 to cause gesture manager 112 to initiate a particular functionality. Generally, network interfaces 216 are configured to communicate data, such as touch data 106, over wired, wireless, or optical networks to computing devices 108. By way of example and not limitation, network interfaces 216 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

While internal electronics module 204 and external electronics module 206 are illustrated and described as including specific electronic components, it is to be appreciated that these modules may be configured in a variety of different ways. For example, in some cases, electronic components described as being contained within internal electronics module 204 may be at least partially implemented at the external electronics module 206, and vice versa. Furthermore, internal electronics module 204 and external electronics module 206 may include electronic components other that those illustrated in FIG. 2, such as sensors, light sources (e.g., LED's), displays, speakers, vibrational components, and so forth. In some implementations, all of the electronic components may be integrated within interactive garment 104, in which case there would be no external electronics module.

Figure 3:
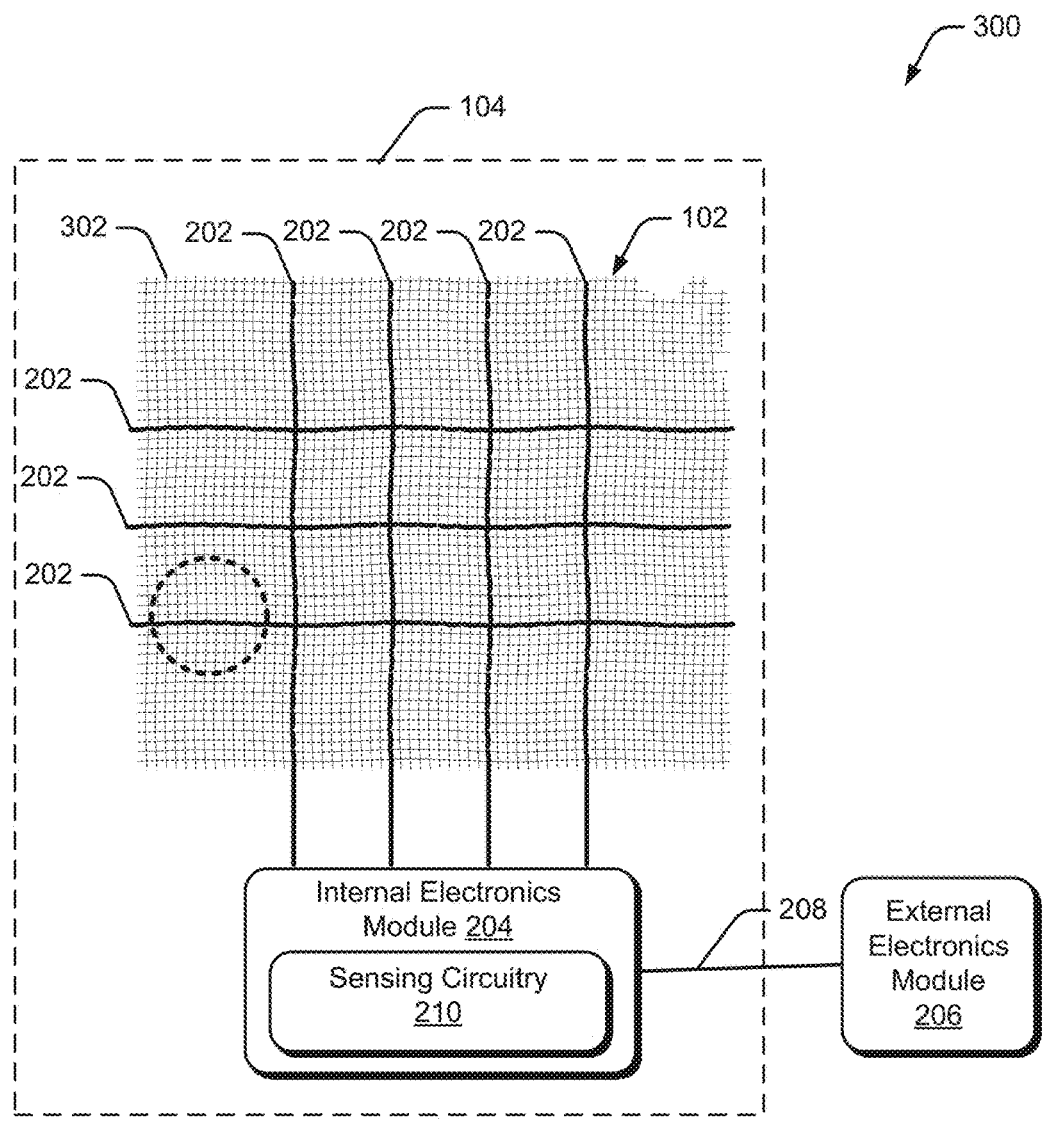
FIG. 3 illustrates an example of the interactive fabric in accordance with one or more implementations.

FIG. 3 illustrates an example 300 of interactive fabric 102 in accordance with one or more implementations. In this example, interactive fabric 102 of the interactive garment 104 includes non-conductive threads 302 woven with conductive threads 202 to form interactive fabric 102. Non-conductive threads 302 may correspond to any type of non-conductive thread, fiber, or fabric, such as cotton, wool, silk, nylon, polyester, cashmere, wool, and so forth. In some cases, rather than weaving conductive threads 202 with non-conductive threads 302, the conductive threads may be embroidered onto interactive fabric 102.

At 304, a zoomed-in view of conductive thread 202 is illustrated. Conductive thread 202 includes a conductive wire 306 that is twisted, braided, or wrapped with a flexible thread 308. Twisting conductive wire 306 with flexible thread 308 causes conductive thread 202 to be flexible and stretchy, which enables conductive thread 202 to be easily woven with non-conductive threads 302 to form interactive fabric 102, or embroidered onto interactive fabric 102.

In one or more implementations, conductive wire 306 is a thin copper wire. It is to be noted, however, that conductive wire 306 may also be implemented using any type of conductive material, such as silver, gold, materials coated with a conductive polymer, and so forth. Flexible thread 308 may be implemented as any type of flexible thread or fiber, such as cotton, wool, silk, nylon, or polyester, to name just a few.

In some cases, conductive thread 202 includes a conductive core that includes at least one conductive wire 306 (e.g., one or more copper wires) and a cover layer, configured to cover the conductive core, that is constructed from flexible threads 308. The conductive wire 306 of the conductive core may be insulated or not insulated.

In one or more implementations, the conductive core may be implemented using a single, straight, conductive wire 306. Alternately, the conductive core may be implemented using a conductive wire 306 and one or more flexible threads 308. For example, the conductive core may be formed by twisting one or more flexible threads 308 (e.g., silk threads, polyester threads, or cotton threads) with conductive wire 306 (e.g., as shown at 304 of FIG. 3), or by wrapping flexible threads 308 around conductive wire 306.

Figure 4A:
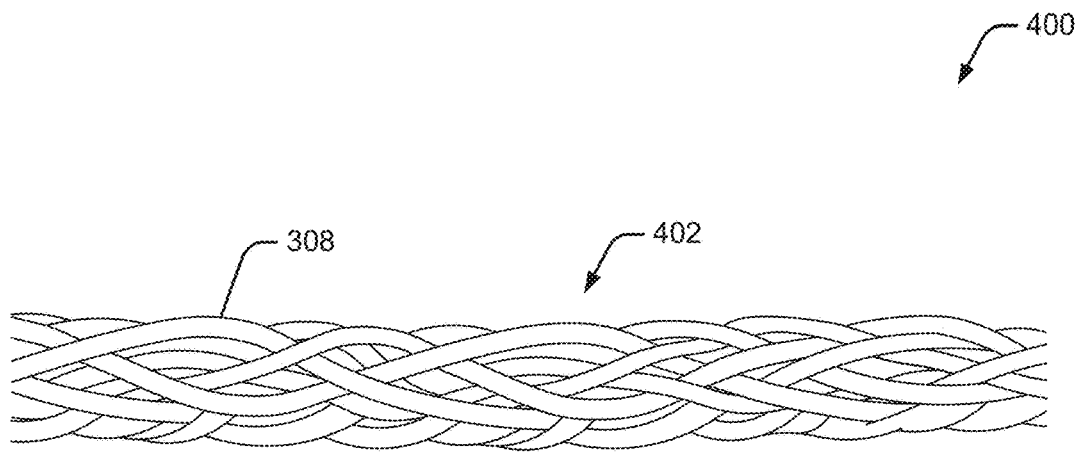
FIG. 4*a* illustrates an example of a conductive core of a conductive thread in accordance with one or more embodiments.

The conductive core may include flexible threads 308 braided with conductive wire 306. As an example, consider FIG. 4a which illustrates an example 400 of a conductive core 402 for a conductive thread in accordance with one or more implementations. In this example, conductive core 402 is formed by braiding conductive wire 306 (not pictured)

with flexible threads 308. A variety of different types of flexible threads 308 may be utilized to braid with conductive wire 306, such as polyester or cotton, in order to form the conductive core.

In one or more implementations, however, silk threads are used for the braided construction of the conductive core. Silk threads are slightly twisted which enables the silk threads to "grip" or hold on to conductive wire 306. Thus, using silk threads may increase the speed at which the braided conductive core can be manufactured. In contrast, a flexible thread like polyester is slippery, and thus does not "grip" the conductive wire as well as silk. Thus, a slippery thread may be more difficult to braid with the conductive wire, which may slow down the manufacturing process.

An additional benefit of using silk threads to create the braided conductive core is that silk is both thin and strong, which enables the manufacture of a thin conductive core that will not break during the interaction textile weaving process. A thin conductive core is beneficial because it enables the manufacturer to create whatever thickness they want for conductive thread 202 (e.g., thick or thin) when covering the conductive core with the second layer.

Figure 4B:
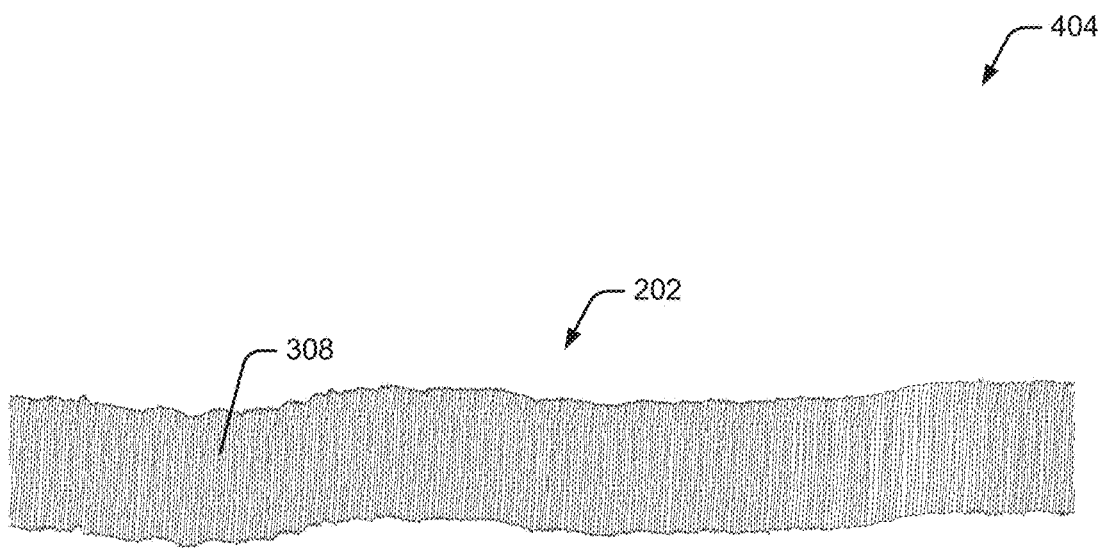
FIG. 4*b* illustrates an example of a conductive thread that includes a cover layer formed by wrapping flexible threads around a conductive core.

After forming the conductive core, a cover layer may be constructed to cover the conductive core. In one or more implementations, the cover layer is constructed by wrapping flexible threads (e.g., polyester threads, cotton threads, wool threads, or silk threads) around the conductive core. As an example, consider FIG. 4b which illustrates an example 404 of a conductive thread that includes a cover layer formed by wrapping flexible threads around a conductive core. In this example, conductive thread 202 is formed by wrapping flexible threads 308 around the conductive core (not pictured). For example, the cover layer may be formed by wrapping polyester threads around the conductive core at approximately 1900 turns per yard.

In one or more implementations, the cover layer includes flexible threads braided around the conductive core. The braided cover layer may be formed using the same type of braiding as described above with regards to FIG. 4a. Any type of flexible thread 308 may be used for the braided cover layer. The thickness of the flexible thread and the number of flexible threads that are braided around the conductive core can be selected based on the desired thickness of conductive thread 202. For example, if conductive thread 202 is intended to be used for denim, a thicker flexible thread (e.g., cotton) and/or a greater number of flexible threads may be used to form the cover layer.

In one or more implementations, conductive thread 202 is constructed with a "double-braided" structure. In this case, the conductive core is formed by braiding flexible threads, such as silk, with a conductive wire (e.g., copper), as described above. Then, the cover layer is formed by braiding flexible threads (e.g., silk, cotton, or polyester) around the braided conductive core. The double-braided structure is strong, and thus is unlikely to break when being pulled during the weaving process. For example, when the double-braided conductive thread is pulled, the braided structure contracts and forces the braided core of copper to contract also with makes the whole structure stronger. Further, the double-braided structure is soft and looks like normal yarn, as opposed to a cable, which is important for aesthetics and feel.

Conductive wire 306 may be insulated to prevent direct contact between crossing conductive threads 202. To do so, conductive wire 306 may be coated with a material such as enamel or nylon. Alternately, rather than insulating conductive wire 306, interactive textile may be generated with three separate textile layers to ensure that crossing conductive threads 202 do not make direct contact with each other.

Interactive fabric 102 can be formed cheaply and efficiently, using any conventional weaving process (e.g., jacquard weaving or 3D-weaving), which involves interlacing a set of longer threads (called the warp) with a set of crossing threads (called the weft). Weaving may be implemented on a conventional frame or machine known as a loom, of which there are a number of types. Thus, a loom can weave non-conductive threads 302 with conductive threads 202 to create interactive fabric 102.

In example 300, conductive thread 202 is woven into interactive fabric 102 to form a patch of conductive threads 202. In this example, the patch of conductive thread 202 is woven into interactive fabric 102 to form a grid that includes a set of substantially parallel conductive threads 202 and a second set of substantially parallel conductive threads 202 that crosses the first set of conductive threads to form the grid. The first set of conductive threads 202 are oriented horizontally and the second set of conductive threads 202 are oriented vertically, such that the first set of conductive threads 202 are positioned substantially orthogonal to the second set of conductive threads 202. It is to be appreciated, however, that conductive threads 202 may be oriented such that crossing conductive threads 202 are not orthogonal to each other. For example, the conductive threads 202 may be woven or embroidered in any type of shape or pattern, such as a circle, diamond, hexagon, to name just a few. While conductive threads 202 are illustrated as being spaced out from each other in FIG. 3, it is to be noted that conductive threads 202 may be weaved very closely together. For example, in some cases two or three conductive threads may be weaved closely together in each direction. Further, in some cases the conductive threads may be oriented as single-dimension sensing lines that do not cross or intersect with each other.

The patch of conductive thread 202 can be made to be visually or tactilely imperceptible to the user depending on the application and preferences. For example, in some cases the conductive thread 202 blends in with the fabric such that users are unable to tell that the patch includes conductive thread 202. Alternately, the conductive thread can be made to be visually or tactilely perceptible to users, such that the user can determine the location of the patch by looking at, or feeling, the conductive thread on interactive fabric 102.

In example 300, sensing circuitry 210 is shown as being integrated within interactive garment 104, and is directly connected to conductive threads 202. During operation, sensing circuitry 210 can determine positions of touch-input on the grid of conductive thread 202 using a variety of different sensing techniques, such as self-capacitance sensing or projective capacitive sensing.

For example, when configured as a self-capacitance sensor, sensing circuitry 210 can charge crossing conductive threads 202 (e.g., horizontal and vertical conductive threads) by applying a control signal (e.g., a sine signal) to each conductive thread 202. When an object, such as the user's finger, touches the grid of conductive thread 202, the conductive threads 202 that are touched are grounded, which changes the capacitance (e.g., increases or decreases the capacitance) on the touched conductive threads 202.

Sensing circuitry 210 uses the change in capacitance to identify the presence of the object. To do so, sensing circuitry 210 detects a position of the touch-input by detecting which horizontal conductive thread 202 is touched, and which vertical conductive thread 202 is touched by detecting changes in capacitance of each respective conductive thread 202. Sensing circuitry 210 uses the intersection of the crossing conductive threads 202 that are touched to determine the position of the touch-input on the grid of conductive threads 202. For example, sensing circuitry 210 can determine touch data by determining the position of each touch as X,Y coordinates on the grid of conductive thread 202.

When implemented as a self-capacitance sensor, "ghosting" may occur when multi-touch-input is received. Consider, for example, that a user touches the grid of conductive thread 202 with two fingers. When this occurs, sensing circuitry 210 determines X and Y coordinates for each of the two touches. However, sensing circuitry 210 may be unable to determine how to match each X coordinate to its corresponding Y coordinate. For example, if a first touch has the coordinates X1, Y1 and a second touch has the coordinates X4,Y4, sensing circuitry 210 may also detect "ghost" coordinates X1, Y4 and X4,Y1.

In one or more implementations, sensing circuitry 210 is configured to detect "areas" of touch-input corresponding to two or more touch-input points on the grid of conductive thread 202. Conductive threads 202 may be weaved closely together such that when an object touches the grid of conductive thread 202, the capacitance will be changed for multiple horizontal conductive threads 202 and/or multiple vertical conductive threads 202. For example, a single touch with a single finger may generate the coordinates X1,Y1 and X2,Y1. Thus, sensing circuitry 210 may be configured to detect touch-input if the capacitance is changed for multiple horizontal conductive threads 202 and/or multiple vertical conductive threads 202. Note that this removes the effect of ghosting because sensing circuitry 210 will not detect touch-input if two single-point touches are detected which are spaced apart.

Alternately, when implemented as a projective capacitance sensor, sensing circuitry 210 charges a single set of conductive threads 202 (e.g., horizontal conductive threads 202) by applying a control signal (e.g., a sine signal) to the single set of conductive threads 202. Then, sensing circuitry 210 senses changes in capacitance in the other set of conductive threads 202 (e.g., vertical conductive threads 202).

In this implementation, vertical conductive threads 202 are not charged and thus act as a virtual ground. However, when horizontal conductive threads 202 are charged, the horizontal conductive threads capacitively couple to vertical conductive threads 202. Thus, when an object, such as the user's finger, touches the grid of conductive thread 202, the capacitance changes on the vertical conductive threads (e.g., increases or decreases). Sensing circuitry 210 uses the change in capacitance on vertical conductive threads 202 to identify the presence of the object. To do so, sensing circuitry 210 detects a position of the touch-input by scanning vertical conductive threads 202 to detect changes in capacitance. Sensing circuitry 210 determines the position of the touch-input as the intersection point between the vertical conductive thread 202 with the changed capacitance, and the horizontal conductive thread 202 on which the control signal was transmitted. For example, sensing circuitry 210 can determine touch data by determining the position of each touch as X,Y coordinates on the grid of conductive thread 202.

Whether implemented as a self-capacitance sensor or a projective capacitance sensor, the conductive thread 202 and sensing circuitry 210 is configured to communicate the touch data that is representative of the detected touch-input to external electronics module 206, which in some cases may be removably coupled to interactive garment 104 via communication interface 208. The microprocessor 212 may then cause communication of the touch data, via network interface 216, to gesture manager 112 to enable the gesture manager 112 to determine gestures based on the touch data, which can be used to control interactive garment 104, computing device 108, applications implemented at computing device 108, or other computing devices.

Gesture manager 112 can be implemented to recognize a variety of different types of gestures, such as touches, taps, swipes, holds, and covers made to interactive fabric 102. To recognize the various different types of gestures, gesture manager 112 can be configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, gesture manager 112 can also determine an area of the conductive thread 202 that is being held (e.g., top, bottom, left, right, or top and bottom. Thus, gesture manager 112 can recognize a variety of different types of holds, such as a cover, a cover and hold, a five finger hold, a five finger cover and hold, a three finger pinch and hold, and so forth.

Notably, there may be a variety of different functionalities that the user may wish to initiate via a gesture to interactive fabric 102. However, there is a limited number of different gestures that a user can realistically be expected to remember. Thus, in one or more implementations gesture manager 112 is configured to select a functionality based on both user input to interactive fabric 102 and a context of the user or computing device 108. The ability to recognize gestures based on context enables the user to invoke a variety of different functionalities using a subset of gestures. For example, for a first context, a first gesture may initiate a first functionality, whereas for a second context, the same first gesture may initiate a second functionality.

In one or more implementations, the context may be determined based on data detected by other types of sensors. For example, sensors other than the interactive fabric 102 may be integrated within interactive garment 102, at computing device 108, and/or at another device that is communicably coupled to computing device 108. For example, gesture manager 112 may receive data from a fitness band worn by the user that tracks the number of steps that the user takes. Such sensors may include, by way of example and not limitation, an accelerometer, an internal measurement unit (IMU), a pedometer, and so forth.

The sensor data may be utilized by gesture manager 112 to determine a context of the user, such as an activity that the user is currently engaged in. For example, data from an IMU or an accelerometer may be utilized by gesture manager 112 to determine that the user is performing an activity such as running, riding a bike, working out, driving a car, and so forth. In this case, gesture manager 112 may initiate different functionalities based on the context. An IMU or integrated sensor could also be used to recognize when the interactive garment is being worn, or not worn, which may also change the resulting functionality.

In some cases, the context of computing device 108 may be based on an application that is currently running on computing device 108. For example, the context may correspond to listening to music when the user is utilizing a music player application to listen to music, and to "receiving a call" when a call is communicated to computing device 106. In these cases, gesture manager 112 can determine the context by determining the application that is currently running on computing device 108. Other non-limiting examples of determining context include determining the context based on calendar data (e.g., determining the user is in a meeting based on the user's calendar), determining context based on location data, and so forth.

Thus, gesture manager 112 may be implemented to initiate the functionality based on the touch-input as well as the context. For example, gesture manager 112 can compare a gesture to a mapping that assigns gestures to different contexts. A given gesture, for example, may be associated with multiple different contexts and associated functionalities. Thus, when a first gesture is received, gesture manager 112 may initiate a first functionality if a first context is detected, or initiate a second, different functionality if a second, different context is detected.

In one or more implementations, communication interface 208 is implemented as a connector that is configured to connect external electronics module 206 to internal electronics module 204 of interactive garment 104. Consider, for example, FIG. 5 which illustrates an example 500 of a connector for connecting an external electronics module to an interactive garment in accordance with one or more implementations. In example 500, interactive garment 104 is illustrated as a jacket.

As described above, interactive garment 104 includes an internal electronics module 204 which include various types of electronics, such as sensing circuitry 210, sensors (e.g., capacitive touch sensors woven into the garment, microphones, or accelerometers), output devices 103 (e.g., LEDs, display, vibration components, speakers, or micro-displays), electrical circuitry, and so forth.

External electronics module 206 includes various electronics that are configured to connect and/or interface with the electronics of internal electronics module 204. Generally, the electronics contained within external electronics module 206 are different than those contained within internal electronics module 204, and may include electronics such as microprocessor 212, power source 214 (e.g., a battery), network interface 216 (e.g., Bluetooth or WiFi), sensors (e.g., accelerometers, heart rate monitors, or pedometers), and so forth. External electronics module 206 may also include the output devices 103 (not pictured in FIG. 2), such as LED's, displays, vibration components, or speakers. In some cases, all of the output devices 103 may be contained in either the internal electronics module 204 or the external electronics module 106. Alternately, each of the internal electronics module 204 and the external electronics module 206 may include at least one output component 103. For example, the internal electronics module 204 may include an LED, while the external electronics module 206 includes a speaker.

In this example, external electronics module 206 is implemented as a strap that contains the various electronics. The strap, for example, can be formed from a material such as rubber, nylon, or any other type of fabric. Notably, however, external electronics module 206 may take any type of form. For example, rather than being a strap, external electronics module 206 could resemble a circular or square piece of material (e.g., rubber or nylon), or a button.

Connector 502 includes a connector plug 504 and a connector receptacle 506. In this example, connector plug 504 is positioned on external electronics module 206 and is configured to attach to connector receptacle 506, which is positioned on interactive garment 104, to form an electronic connection between external electronics module 206 and interactive garment 104. For example, in FIG. 5, connector receptacle 506 is positioned on a sleeve of interactive garment 104, which is illustrated as a jacket.

In various implementations, connector plug 504 may resemble a snap or button, and is configured to connect or attach to connector receptacle 506 via a magnetic or mechanical coupling. For example, in some implementations magnets on connector plug 504 and connector receptacle 506 cause a magnetic connection to form between connector plug 504 and connector receptacle 506. Alternately, a mechanical connection between these two components may cause the components to form a mechanical coupling, such as by "snapping" together.

Connector 502 may be implemented in a variety of different ways. In one or more implementations, connector plug 504 includes an anisotropic conducting polymer which is configured to connect to circular pads of a printed circuit board (PCB) implemented at connector receptacle 506. In another implementation, connector plug 504 may include compliant polyurethane polymers to provide compliance to metal pads implemented at connector receptacle 506 to enable an electromagnetic connection. In another implementation, connector plug 504 and connector receptacle 506 may each include magnetically coupled coils which can be aligned to provide power and data transmission.

Figure 6:
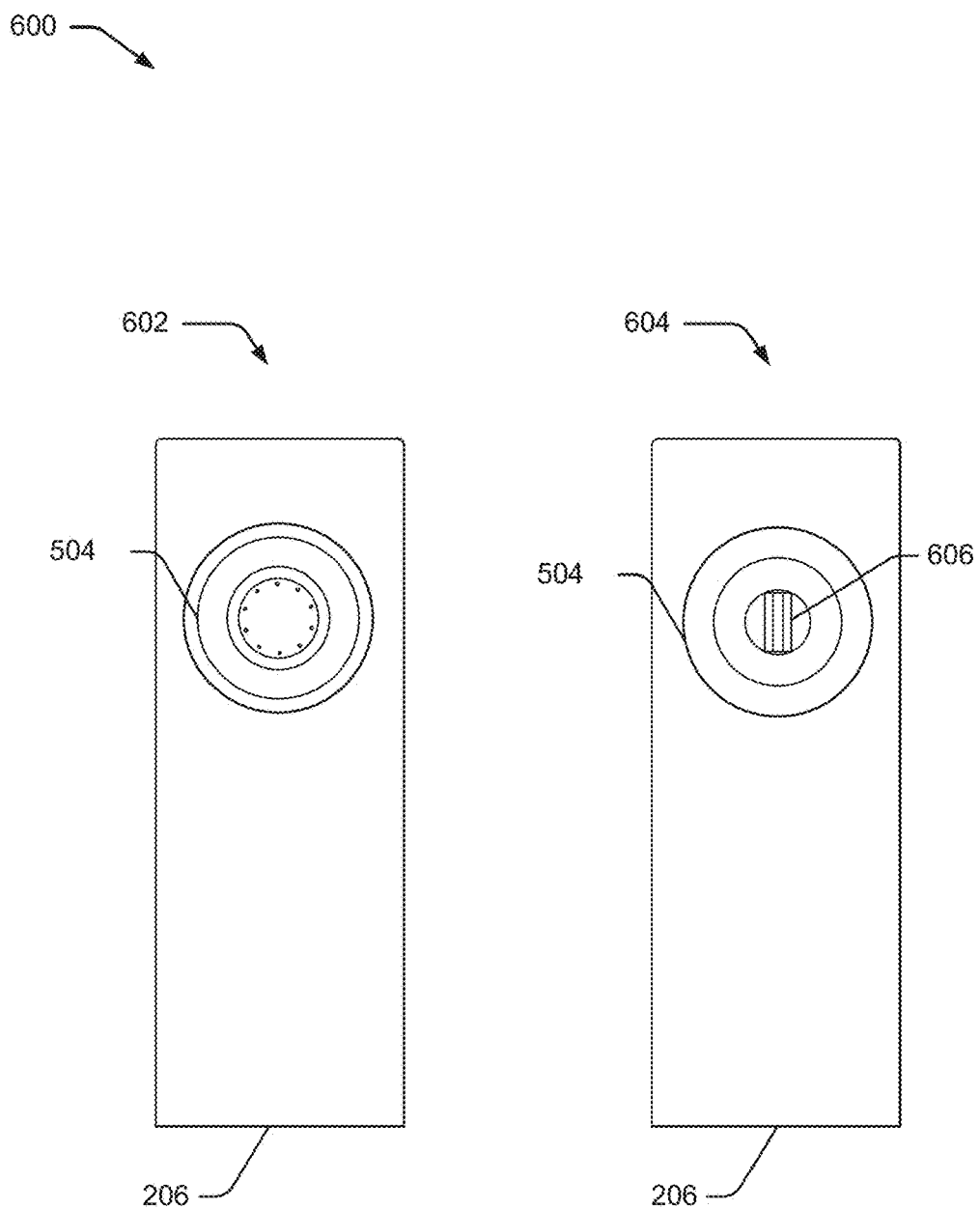
FIG. 6 illustrates an example of the connector when implemented with an anisotropic conducting polymer in accordance with one or more implementations.

FIG. 6 illustrates an example 600 of connector 502 when implemented with an anisotropic conducting polymer in accordance with one or more implementations.

At 602, a top side of connector plug 504 is shown. In this case, the top side of connector plug 504 resembles a round, button-like structure. Notably the top side of connector plug 504 may be implemented with various different shapes (e.g., square or triangular). Further, in some cases the top side of connector plug 504 may resemble something other than a button or snap.

In this example, the top side of connector plug 504 includes tiny holes that enables light from light sources (e.g., LEDs) to shine through. Of course, other types of input or output units could also be positioned here, such as a microphone or a speaker.

At 604, a bottom side of connector plug 504 is shown. The bottom side of connector plug 504 includes an anisotropic conducting polymer 606 to enable electrical connections between the electronics of interactive garment 104 and the electronics of external electronics module 206.

Figure 7:
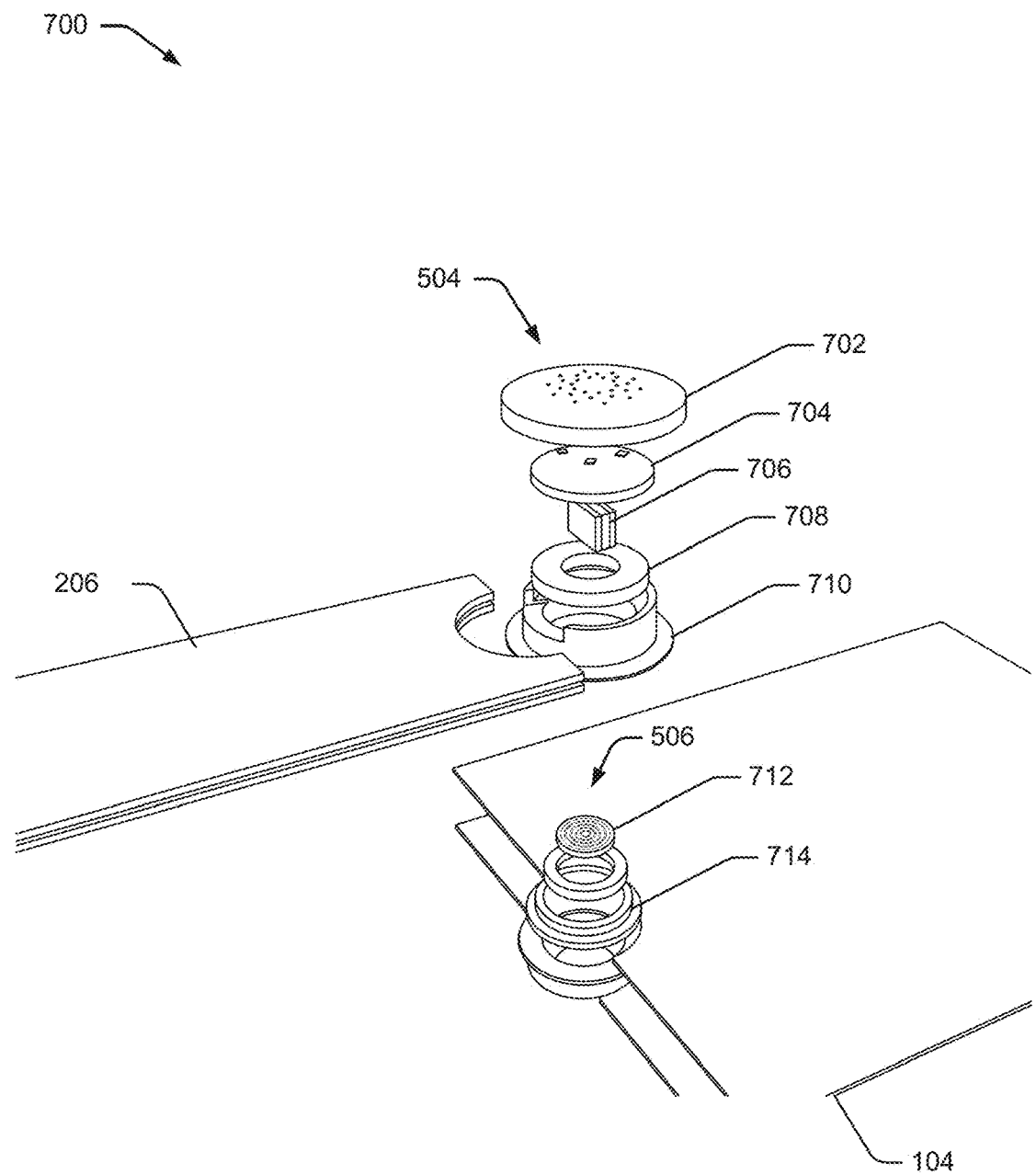
FIG. 7 illustrates an exploded view of the connector when implemented with an anisotropic conducting polymer in accordance with one or more implementations.

In more detail, consider FIG. 7 which illustrates an exploded view 700 of connector 502 when implemented with an anisotropic conducting polymer in accordance with one or more implementations.

In this example, connector plug 504 of connector 502 includes a button cap 702, a printed circuit board (PCB) 704, anisotropic conducting polymer 706, a magnet 708, and a casing 710.

Button cap 702 resembles a typical button, and may be made from a variety of different materials, such as plastic, metal, and so forth. In this example, button cap 702 includes holes which enable light from LEDs to shine through.

PCB 704 is configured to electrically connect electronics of interactive garment 104 to anisotropic conducting polymer 706. A top layer of PCB 704 may include the LEDs that shine through the holes in button cap 702. A bottom layer of PCB 704 includes contacts which electrically connect to anisotropic conducting polymer 706 positioned beneath PCB 704.

Anisotropic conducting polymer 706 includes a strip of anisotropic material that is configured to form a connection with connector receptacle 506. The anisotropic material include any type of anisotropic material.

Magnet 708 is configured to enable a magnetic connection to connector receptacle 506. The magnetic connection enables connector plug 504 to attach to connector receptacle 506 without the need to apply force to connect, which reduces the chance of the connection wearing down over time. Alternately, in one or more implementations, connector plug 504 may be implemented without magnet 708. For example, connector plug 504 could be implemented as physical or mechanical snap that snaps to connector receptacle 506. Casing 710 is configured to hold the components of connector plug 504, and can be implemented from a variety of different materials such as plastic, metal, and so forth.

In this example, connector receptacle 506 includes a receptacle PCB 712 which includes circular pads which are configured to connect to anisotropic conducting polymer 706. The bottom layer of receptacle PCB 712 includes connections to the electronics of interactive garment 104.

Connector receptacle may also include a metallic component 714 which is configured to generate a magnetic force with magnet 708 of connector plug 504 to form the magnetic connection between connector plug 504 and connector receptacle 506. Metallic component 714 may be implemented as any type of metal or alloy, or as another magnet, that can generate a magnetic force with magnet 708. Connector receptacle 506 may also include other components, such as a housing, a washer, and so forth.

Notably, anisotropic conducting polymer 706 includes various properties which make for a good connector, which include rotational tolerance, mechanical compliance, multi-pin electrical and power transmission, and being waterproof.

For instance, when connector plug 504 attaches to connector receptacle 506, an electrical connection is formed between anisotropic conducting polymer 706 and receptacle PCB 712. The anisotropic conducting polymer 706 provides rotational tolerance because the strip of anisotropic material can be rotated 360 degrees and maintain the same connection to the circular pads of receptacle PCB 712. This is beneficial because when wearing a garment, the strap of external electronics module 206 will naturally move around. Thus, the rotational tolerance enables the connector to be rotated without losing the connection between connector plug 504 and connector receptacle 506. Furthermore, the anisotropic conducting polymer 706 is elastomeric, which causes the strip of material to shrink and conform under mechanical force.

Anisotropic conducting polymer 706 provides multi-pin electrical transmissions and power transfer transmissions simultaneously. For example, the anisotropic material causes conduction to occur in just one direction, which means that the conductive paths can operate completely independently, without interfering with each other. This enables multiple conducting channels, which makes it easy to isolate multiple data lines or power lines from each other using anisotropic conducting polymer 706 and the circular structure of receptacle PCB 712.

Additionally, anisotropic conducting polymer 706 is waterproof which prevents connector 502 from being damaged by water, such as when being worn in the rain or when being washed.

Connector 502 may be implemented in a variety of different ways. In one or more implementations, instead of using anisotropic conducting polymer 706, connector plug 504 may include compliant polyurethane polymers to provide compliance to metal pads implemented at connector receptacle 506 to enable an electromagnetic connection. In another implementation, connector plug 504 and connector receptacle 506 may each include magnetically coupled coils which can be aligned to provide power and data transmission between interactive garment 104 and external electronics module 206.

Example Methods

Figure 8:
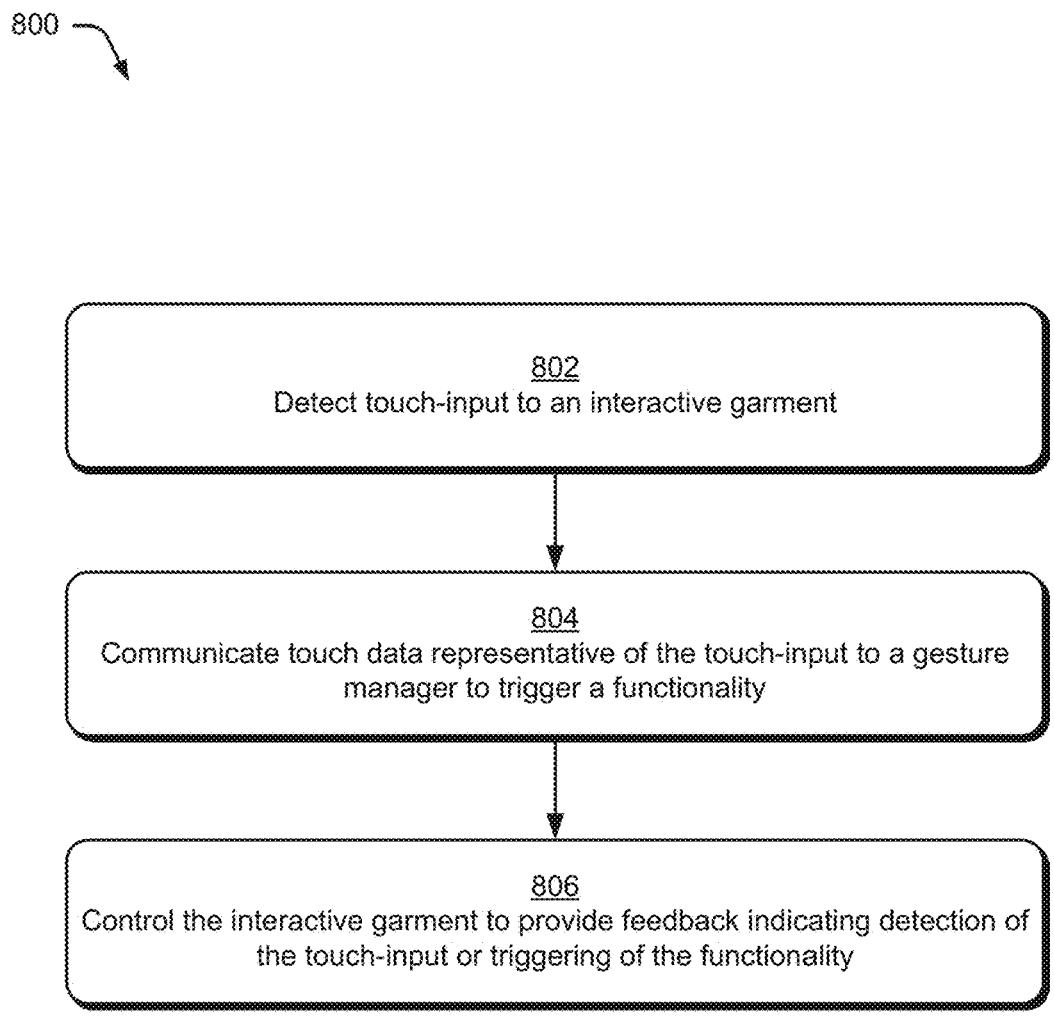
FIG. 8 illustrates an example method of triggering a functionality through interaction with an interactive garment.
Figure 9:
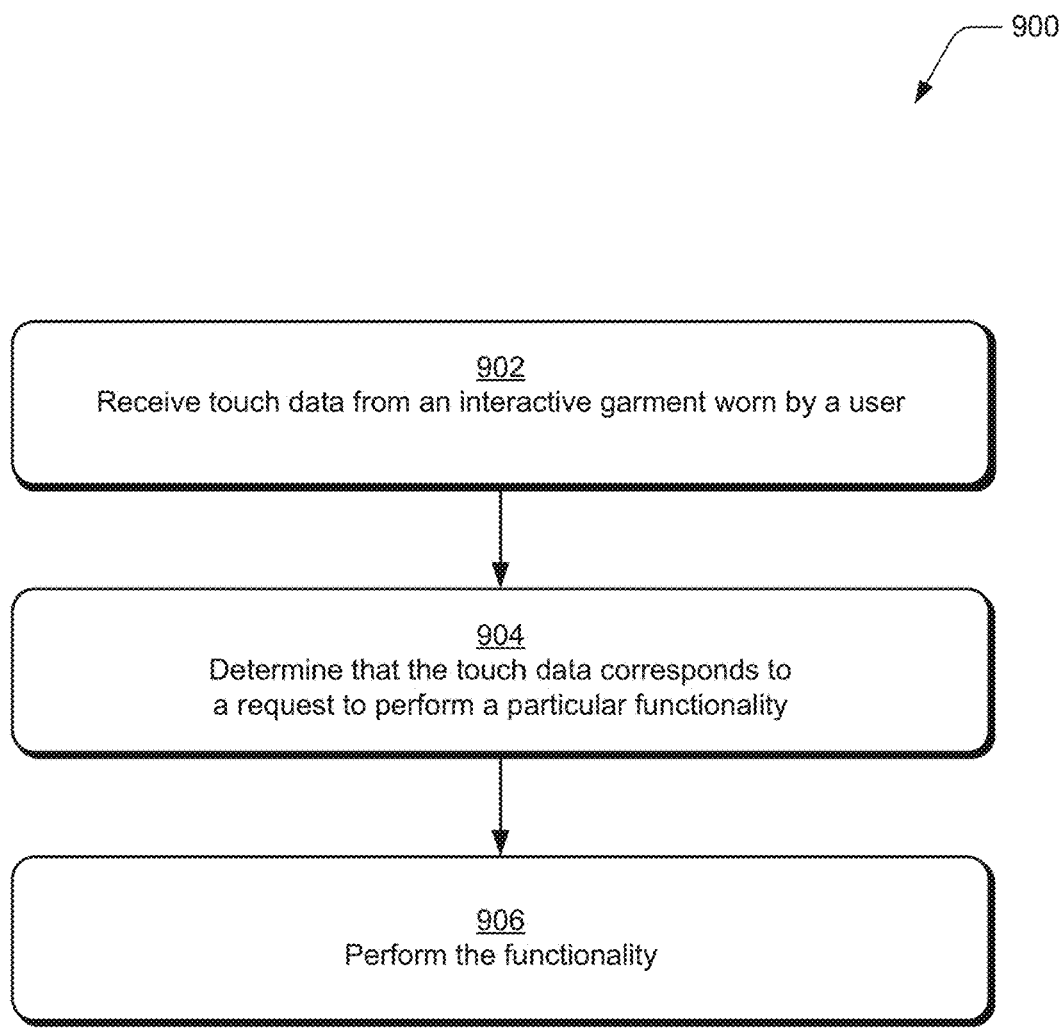
FIG. 9 illustrates an example method of performing a functionality that is triggered by user interaction with an interactive garment.

FIGS. 8 and 9 illustrate an example method 800 (FIG. 8) of triggering a functionality through interaction with an interactive garment and an example method 900 (FIG. 9) of performing a functionality that is triggered by user interaction with an interactive garment. These methods and other methods herein are shown as sets of blocks that specify operations performed but are not necessarily limited to the order or combinations shown for performing the operations by the respective blocks. The techniques are not limited to performance by one entity or multiple entities operating on one device.

FIG. 8 illustrates an example method 800 of triggering a functionality through interaction with an interactive garment.

At 802, touch-input to an interactive garment is detected. For example, sensing circuitry 210 detects touch-input to the interactive fabric 102 which is integrated within interactive garment 104 when an object, such as a user's finger, touches interactive fabric 102.

Figure 10:
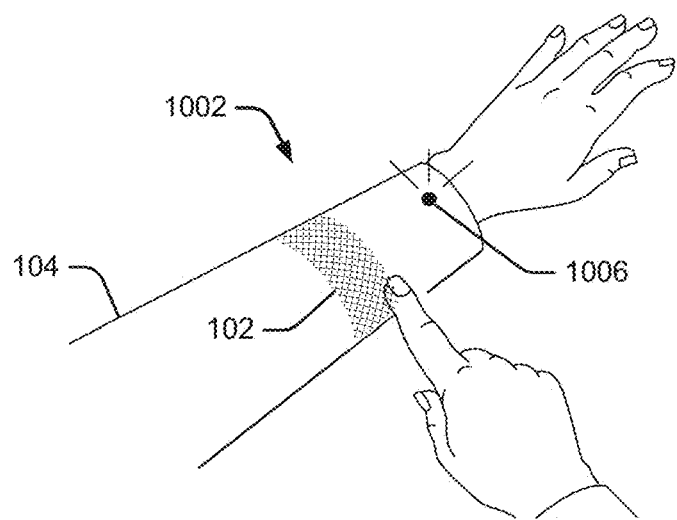
FIG. 10 which illustrates an example of receiving touch-input to an interactive fabric in accordance with one or more implementations.
Figure 10:
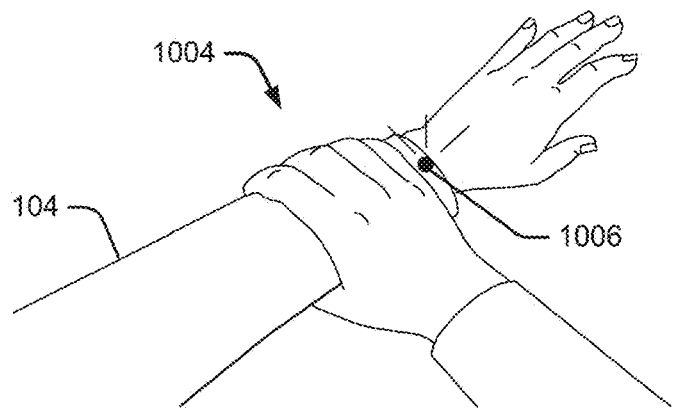

As an example, consider FIG. 10 which illustrates an example of receiving touch-input to an interactive fabric in accordance with one or more implementations. At 1002, touch-input is received when a user provides a single finger touch to interactive fabric 102 of interactive garment 104. As another example, at 1004, touch-input is received when a user provides a "hold" gesture to interactive fabric 102 by placing their hand over interactive fabric 102. Of course, other types of touch-input may also be received, such as swipes, multi-finger touches, and so forth.

As another example, touch-input can be received when a user provides a "brush in" or "brush out" gesture to interactive fabric 102 by brushing their hand over interactive fabric. For example, the user can provide a brush-in gesture by moving their hand upwards over interactive fabric when implemented on the cuff of a jacket, or provide a brush-out gesture by moving their hand downwards over interactive fabric when implemented on the cuff of the jacket. As another example, touch-input can be received when a user provides a "double tap" gesture to interactive fabric 102 by double tapping interactive fabric 102. As another example, touch-input can received when a user provides moves their finger in a particular pattern on the interactive fabric 102, such as by moving their finger in a circle on the interactive fabric 102.

At 804, touch data representative of the touch-input is communicated to a gesture manager to trigger a functionality. For example, sensing circuitry 210 initiates communication of touch data 106 representative of the touch-input to gesture manager 112 via network 110, to trigger a functionality, such as placing a phone call, answering a phone call, declining a phone call, saving the user's current location, and so forth. As an example, the user can provide the brush-in gesture in order to answer a phone call, and provide the brush-out gesture in order to decline the phone call. As discussed throughout, in some cases, the touch data 106 may be communicated to gesture manager 112 or an application 114 implemented at a device (e.g., the user's smartphone) coupled to interactive fabric 102 (e.g., via a Bluetooth connection). Alternately or additionally, the touch data 106 may be communicated to a cloud-based service (e.g., remote service 116) via the Internet.

Optionally, at 806, the interactive garment is controlled to provide feedback indicating detection of the touch-input or triggering of the functionality. For example, sensing circuitry 210 can control one or more output devices 103 to provide feedback indicating the touch-input was detected, such as by controlling a light source to blink or controlling a vibration component to vibrate. As another example, sensing circuitry 210 can control one or more output device 103 to provide feedback indicating that a particular function has been triggered. In FIG. 10, for instance, an LED 1006 is integrated into the sleeve of interactive garment 104, and is controlled to output light (e.g., by blinking) in response to detecting the touch-input or in response to confirming that the touch-input caused the particular functionality to be triggered.

FIG. 9 illustrates an example method 900 of performing a functionality that is triggered by user interaction with an interactive garment.

At 902, touch data is received from an interactive garment worn by a user. For example, gesture manager 112 receives touch data 106 from interactive garment 104 when user-input is provided to the interactive fabric 102.

At 904, it is determined whether the touch data corresponds to a request to perform a particular functionality. For example, gesture manager 112 determines whether touch data 106 corresponds to a user input or gesture that is mapped to a particular functionality, such as answering a phone call, creating a journal entry, and so forth. As described throughout, any type of user input or gesture may be used to trigger the functionality, such as swiping, tapping, or holding interactive fabric 102. In one or more implementations, gesture manager 112 enables application developers or users to configure the types of user input or gestures that can be used to trigger various different types of functionalities.

At 906, the functionality is performed. For example, gesture manager 112 causes a particular functionality to be performed, such as by answering a phone call, creating a journal entry, and so forth.

Example Computing System

Figure 11:
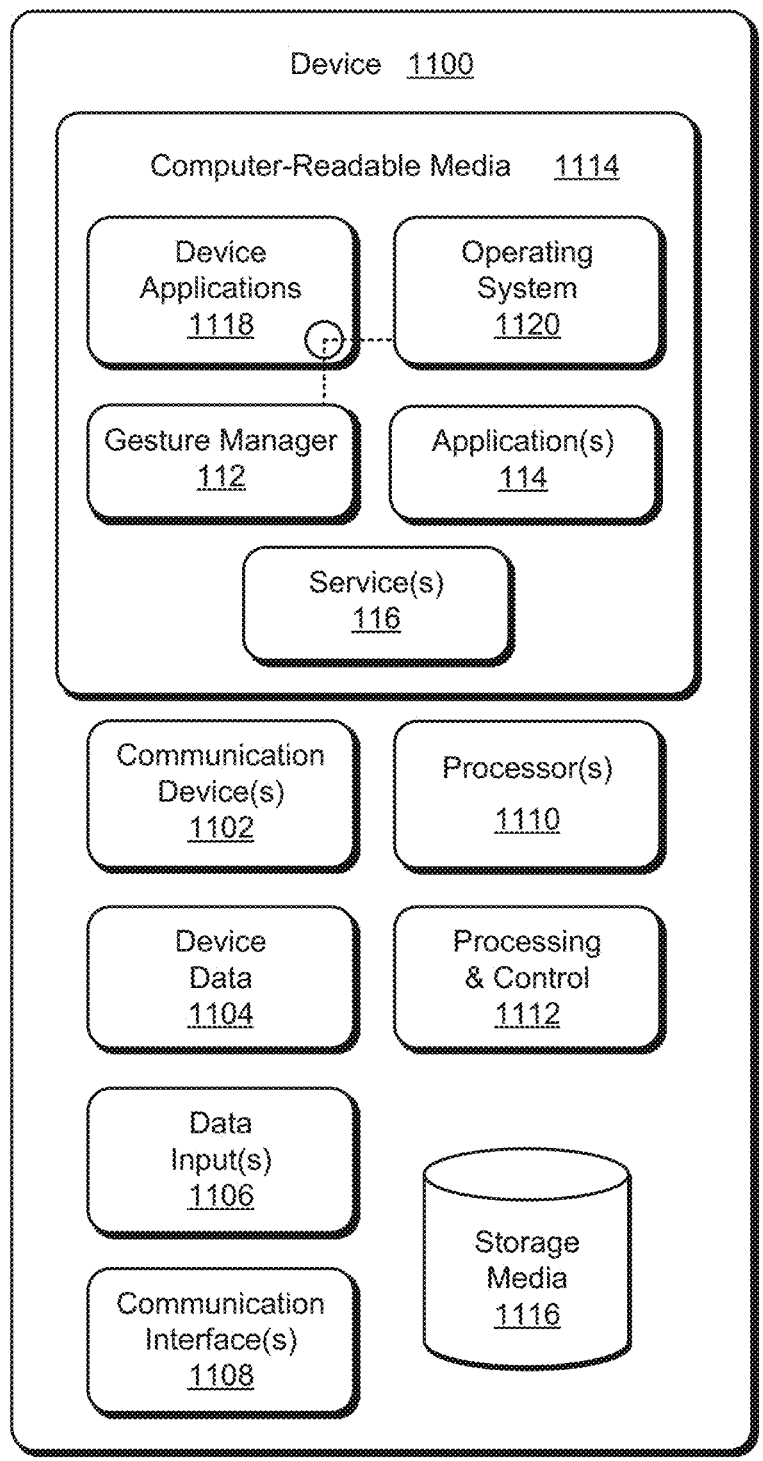
FIG. 11 illustrates various components of an example computing system that can be implemented as any type of client, server, and/or computing device as described with reference to the previous FIGS. 1-10 to implement an interactive fabric.

FIG. 11 illustrates various components of an example computing system 1100 that can be implemented as any type of client, server, and/or computing device as described with reference to the previous FIGS. 1-10 to implement an interactive fabric. In embodiments, computing system 1100 can be implemented as one or a combination of a wired and/or wireless wearable device, System-on-Chip (SoC), and/or as another type of device or portion thereof. Computing system 1100 may also be associated with a user (e.g., a person) and/or an entity that operates the device such that a device describes logical devices that include users, software, firmware, and/or a combination of devices.

Computing system 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on computing system 1100 can include any type of audio, video, and/or image data. Computing system 1100 includes one or more data inputs 1106 via which any type of data, media content, and/or inputs can be received, such as human utterances, touch data generated by interactive fabric 102, user-selectable inputs (explicit or implicit), messages, music, television media content, recorded video content, and any other type of audio, video, and/or image data received from any content and/or data source.

Computing system 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between computing system 1100 and a communication network by which other electronic, computing, and communication devices communicate data with computing system 1100.

Computing system 1100 includes one or more processors 1110 (e.g., any of microprocessors, controllers, and the like), which process various computer-executable instructions to control the operation of computing system 1100 and to enable techniques for, or in which can be embodied, interactive textiles. Alternatively or in addition, computing system 1100 can be implemented with any one or combination of hardware, firmware, or fixed logic circuitry that is implemented in connection with processing and control circuits which are generally identified at 1112. Although not shown, computing system 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1100 also includes computer-readable media 1114, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1100 can also include a mass storage media device 1116.

Computer-readable media 1114 provides data storage mechanisms to store device data 1104, as well as various device applications 1118 and any other types of information and/or data related to operational aspects of computing system 1100. For example, an operating system 1120 can be maintained as a computer application with computer-readable media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components, engines, or managers to implement an interactive fabric. In this example, device applications 1118 include gesture manager 112, application 114, and service 116.

Conclusion

Although embodiments of techniques using, and objects including, an interactive fabric have been described in language specific to features and/or methods, it is to be understood that the subject of the appended claims is not necessarily limited to the specific features or methods described. Rather, the specific features and methods are disclosed as example implementations of an interactive fabric.

What is claimed is:

1. An interactive garment comprising:
an interactive fabric within a sleeve of the interactive garment, the interactive fabric having an array of conductive lines, the conductive lines being substantially parallel and integrated with the interactive fabric to form a capacitive touch sensor; and
sensing circuitry coupled to the conductive lines, the sensing circuitry configured to:
detect touch-input to at least two individual conductive lines of the array of conductive lines when a user wearing the interactive garment touches the at least two individual conductive lines by covering and holding a wrist of the sleeve with a hand, the detected touch-input comprising a change in capacitance simultaneously in the at least two individual conductive lines;
process the touch-input to provide touch data; and
communicate the touch data to a gesture manager to cause the gesture manager to initiate a functionality associated with the touch-input, the touch data including data to enable the gesture manager to determine a duration of the touch to recognize the touch-input as a cover gesture or a cover-and-hold gesture.

2. The interactive garment as recited in claim 1, further comprising an output device configured to provide audio, visual, or haptic feedback when the touch-input is detected.

3. The interactive garment as recited in claim 2, wherein the output device comprises one or more of a light source, a speaker, a display, or a vibration component.

4. The interactive garment as recited in claim 1, wherein the gesture manager initiates the functionality in the interactive garment or at a computing device coupled to the interactive garment based on the touch data and sensor data received from one or more sensors integrated within the interactive garment.

5. The interactive garment as recited in claim 1, wherein the sensing circuitry is contained within an internal electronics module that is configured to interface with a removable electronics module to enable the transfer of power and data between the internal electronics module and the removable electronics module.

6. The interactive garment as recited in claim 5, wherein the removable electronics module comprises a microprocessor, a power source, and a network interface.

7. The interactive garment as recited in claim 1, wherein the conductive lines in the array comprise conductive thread.

8. The interactive garment as recited in claim 1, wherein:
the array of conductive lines comprises a first array of substantially parallel conductive lines;
the interactive fabric comprises a second array of substantially parallel conductive lines; and
the second array of substantially parallel conductive lines crosses the first array of substantially parallel conductive lines to form a grid of conductive lines.

9. The interactive garment as recited in claim 1, wherein the conductive lines are integrated with the interactive fabric by being woven into the interactive fabric or embroidered onto the interactive fabric.

10. The interactive garment of claim 1, wherein the data corresponds to the cover-and-hold gesture.

11. A system comprising:
an interactive garment comprising an interactive fabric within a sleeve of the interactive garment, the interactive fabric having an array of conductive lines that are substantially parallel with one another, the conductive lines integrated with the interactive fabric to form a capacitive touch sensor;
an internal electronics module coupled to the array of conductive lines, the internal electronics module comprising sensing circuitry configured to detect touch-input to at least two individual conductive lines of the array of conductive lines when a user wearing the interactive garment touches the at least two individual conductive lines by covering and holding a portion of the sleeve with a hand, the detected touch-input comprising a change in capacitance simultaneously in the at least two individual conductive lines;
an external electronics module comprising one or more electronic components, the external electronics module removably coupled to the interactive garment;
a communication interface configured to enable communication between the internal electronics module and the external electronics module when the external electronics module is coupled to the interactive garment; and
a gesture manager configured to:
recognize the detected touch-input as a gesture based on the at least two individual conductive lines in the portion of the sleeve that are covered by the hand of the user;
determine a duration of the touch-input to the at least two individual conductive lines;
based on the duration of the touch-input, recognize the gesture as a cover gesture or a cover-and-hold gesture; and
initiate a functionality associated with the recognized gesture.

12. The system of claim 11, further comprising an output device configured to provide audio, visual, or haptic feedback when the touch-input is detected.

13. The system of claim 12, wherein the output device comprises one or more of a light source, a speaker, a display, or a vibration component.

14. The system of claim 11, wherein the interactive fabric comprises an additional array of conductive lines that crosses the array of conductive lines to form a grid of conductive lines to detect a region or position of the touch-input on the grid of conductive lines.

15. The system of claim 11, wherein the gesture manager is configured to initiate the functionality in the interactive garment or at a computing device coupled to the interactive garment.

16. The system of claim 11, wherein the array of conductive lines comprises a first array of substantially parallel conductive lines;
the interactive fabric comprises an additional array of substantially parallel conductive lines; and
the additional array of substantially parallel conductive lines crosses the array of conductive lines to form a grid of conductive lines.

17. The system of claim 11, wherein the conductive lines are integrated with the interactive fabric by being woven into the interactive fabric or embroidered onto the interactive fabric.

18. The system of claim 11, wherein the gesture is recognized as the cover-and-hold gesture.

19. A computer-implemented method comprising:
receiving, at a computing device, touch data from an interactive garment worn by a user, the interactive garment comprising an interactive fabric having an array of substantially parallel conductive lines within the interactive fabric to form a capacitive touch sensor on a wrist area of the interactive garment, the touch data comprising a change in capacitance simultaneously in the at least two individual conductive lines of the array of substantially parallel conductive lines when the user covers and holds the wrist area of the interactive garment with a hand;
determining a duration of the change in capacitance to the at least two individual conductive lines;
recognizing, based on the duration of the change in capacitance, the touch data as a cover gesture or a cover-and-hold gesture;
determining, at the computing device, that the cover gesture or the cover-and-hold gesture corresponds to a request to perform a particular functionality; and
performing the particular functionality.

20. The computer-implemented method of claim 19, further comprising:
responsive to receiving the touch data, providing at least one of:
audio feedback via a speaker;
visual feedback via a light source or a display; or
haptic feedback via a vibration component.

21. The computer-implemented method of claim 19, wherein performing the particular functionality includes initiating the particular functionality in the interactive garment or at the computing device.

22. The computer-implemented method of claim 19, wherein:
the interactive fabric comprises an additional array of conductive lines that crosses the array of substantially parallel conductive lines to form a grid of conductive lines; and
the method further comprises detecting a region on the grid of conductive lines corresponding to the touch data.

23. The computer-implemented method of claim 19, wherein the touch data is recognized as the cover-and-hold gesture.

* * * * *